(12) United States Patent
Imamura et al.

(10) Patent No.: US 12,381,261 B2
(45) Date of Patent: Aug. 5, 2025

(54) SEALED BATTERY, ASSEMBLED BATTERY, AND METHOD FOR MANUFACTURING SEALED BATTERY

(71) Applicant: ELIIY POWER CO., LTD., Tokyo (JP)

(72) Inventors: Yosuke Imamura, Shinagawa-ku (JP); Kenichi Matsubuchi, Shinagawa-ku (JP); Hirotaka Sato, Shinagawa-ku (JP); Tomoyuki Yuasa, Shinagawa-ku (JP)

(73) Assignee: ELIIY POWER CO., LTD., Tokyo (JP)

( * ) Notice: Subject to any disclaimer, the term of this patent is extended or adjusted under 35 U.S.C. 154(b) by 770 days.

(21) Appl. No.: 16/635,083

(22) PCT Filed: Jul. 23, 2018

(86) PCT No.: PCT/JP2018/027531
§ 371 (c)(1),
(2) Date: Jan. 29, 2020

(87) PCT Pub. No.: WO2019/026672
PCT Pub. Date: Feb. 7, 2019

(65) Prior Publication Data
US 2020/0358069 A1    Nov. 12, 2020

(30) Foreign Application Priority Data
Aug. 3, 2017 (JP) .................................. 2017-150767

(51) Int. Cl.
*H01M 10/0585*    (2010.01)
*H01M 50/10*    (2021.01)
(Continued)

(52) U.S. Cl.
CPC ....... *H01M 10/0585* (2013.01); *H01M 50/10* (2021.01); *H01M 50/103* (2021.01);
(Continued)

(58) Field of Classification Search
None
See application file for complete search history.

(56) References Cited

U.S. PATENT DOCUMENTS

2007/0196732 A1* 8/2007 Tatebayashi ........ H01M 50/528
429/162
2011/0129718 A1* 6/2011 Lee ..................... H01M 50/531
429/153
(Continued)

FOREIGN PATENT DOCUMENTS

CN    102386437 A    3/2012
JP    2012-074387 A    4/2012
(Continued)

OTHER PUBLICATIONS

European Patent Office, Extended European Search Report issued in corresponding Application No. 18840748.0, dated Mar. 26, 2021.

*Primary Examiner* — Ula C Ruddock
*Assistant Examiner* — Mary Grace Byram
(74) *Attorney, Agent, or Firm* — Stites & Harbison, PLLC; Jeffrey A. Haeberlin; James R. Hayne

(57) ABSTRACT

A sealed battery of the present invention comprises: an electrode assembly having a multilayered structure in which a positive electrode, a negative electrode, and a separator are layered; and a first clip. The positive electrode has a positive-electrode current collection sheet and a positive-electrode active material layer; and the negative electrode has a negative-electrode current collection sheet and a negative-electrode active material layer. The electrode assembly has the following sections: a positive-electrode extended section which is a layered portion of the positive-electrode current
(Continued)

collection sheet and extends from the multilayered structure; and a negative-electrode extended section which is a layered portion of the negative-electrode current collection sheet and extends from the multilayered structure. The first clip is provided in such a way that either one of the positive-electrode extended section and the negative-electrode extended section is sandwiched and fastened between the first plate section and the second plate section; and the first clip has a first gripping opening. The positive-electrode extended section or the negative-electrode extended section fastened by the first clip has a first fold portion formed by folding the current collection sheet by using an end of the first or second plate section at the first gripping opening as a fulcrum point.

20 Claims, 7 Drawing Sheets

(51) Int. Cl.
*H01M 50/103* (2021.01)
*H01M 50/176* (2021.01)
*H01M 50/20* (2021.01)
*H01M 50/209* (2021.01)
*H01M 50/531* (2021.01)
*H01M 50/538* (2021.01)
*H01M 50/54* (2021.01)
*H01M 50/547* (2021.01)
*H01M 50/186* (2021.01)
*H01M 50/534* (2021.01)
*H01M 50/536* (2021.01)

(52) U.S. Cl.
CPC ......... *H01M 50/176* (2021.01); *H01M 50/20* (2021.01); *H01M 50/209* (2021.01); *H01M 50/531* (2021.01); *H01M 50/538* (2021.01); *H01M 50/54* (2021.01); *H01M 50/186* (2021.01); *H01M 50/547* (2021.01); *H01M 50/534* (2021.01); *H01M 50/536* (2021.01)

(56) References Cited

U.S. PATENT DOCUMENTS

| | | | |
|---|---|---|---|
| 2012/0052360 A1 | 3/2012 | Fujiwara et al. | |
| 2017/0365839 A1* | 12/2017 | Kawate | H01G 11/82 |
| 2018/0047971 A1* | 2/2018 | Hirose | H01G 11/08 |
| 2018/0090737 A1 | 3/2018 | Sawanishi et al. | |
| 2018/0269472 A1* | 9/2018 | Ise | H01M 10/4207 |

FOREIGN PATENT DOCUMENTS

| | | |
|---|---|---|
| JP | 2013-239293 A | 11/2013 |
| JP | 2014-017053 A | 1/2014 |
| JP | 2014-135204 A | 7/2014 |
| JP | 2015-225740 A | 12/2015 |
| WO | 2016/147955 A1 | 9/2016 |
| WO | 2016/157370 A1 | 10/2016 |

* cited by examiner

[FIG. 1]
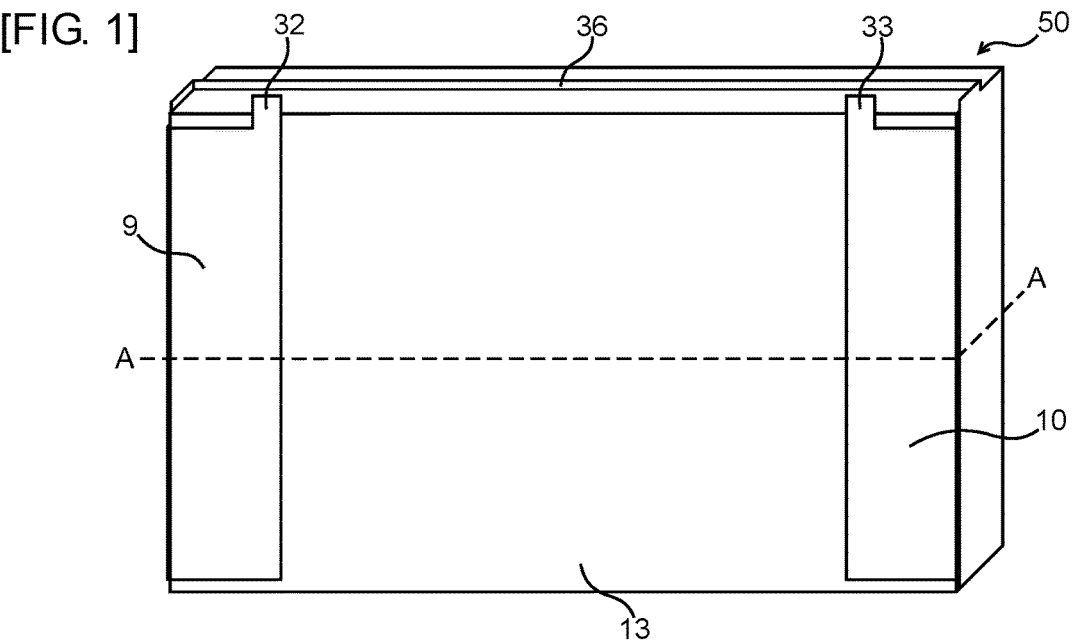
[FIG. 2]
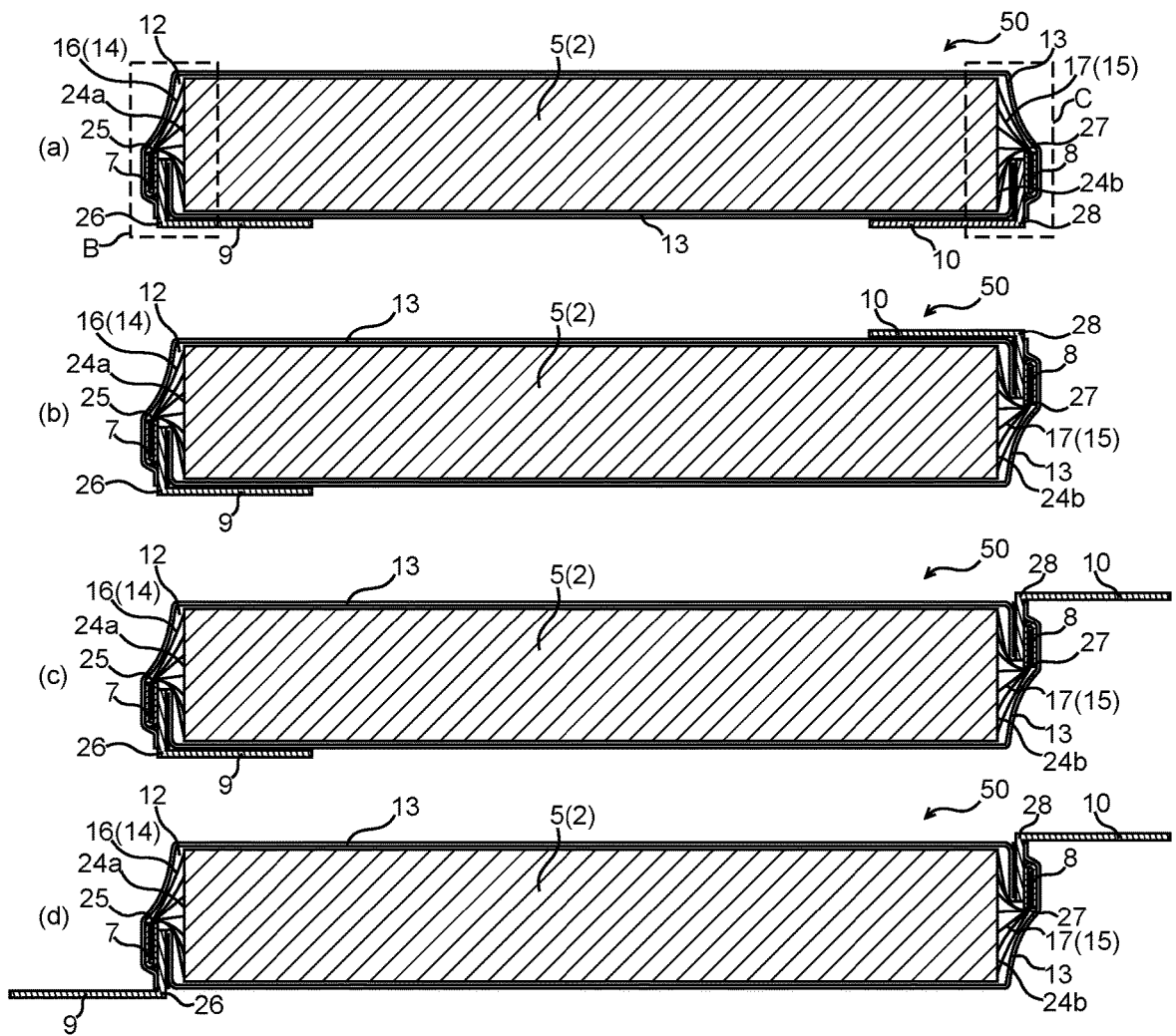

[FIG. 3]
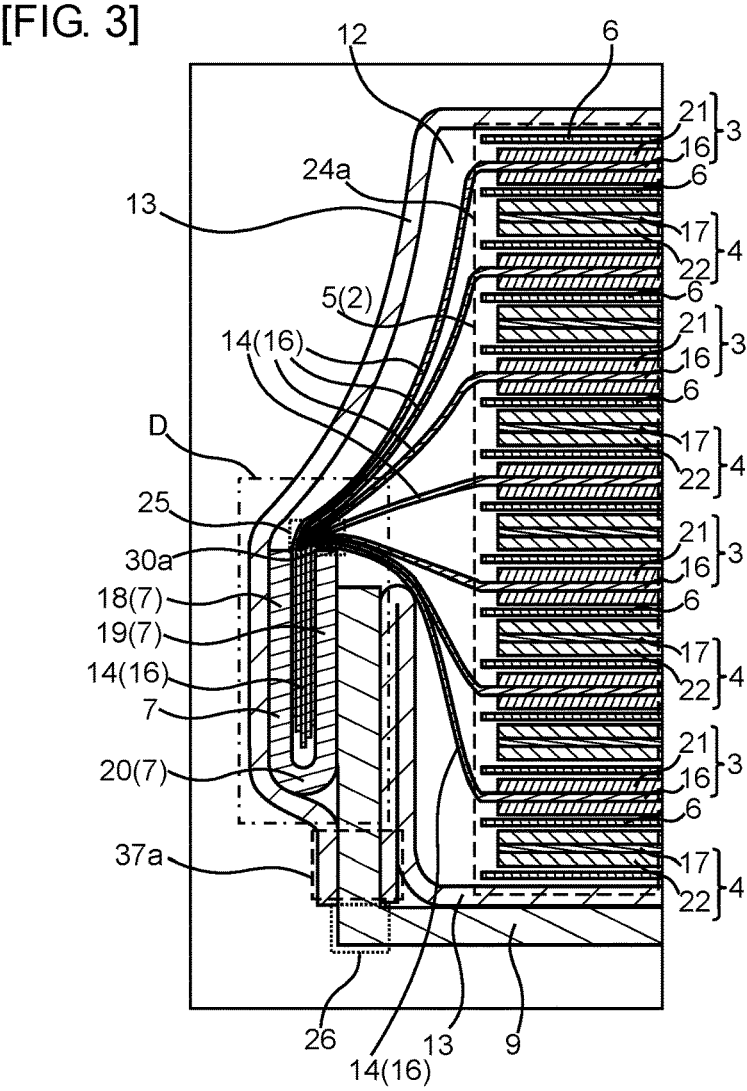
[FIG. 4]
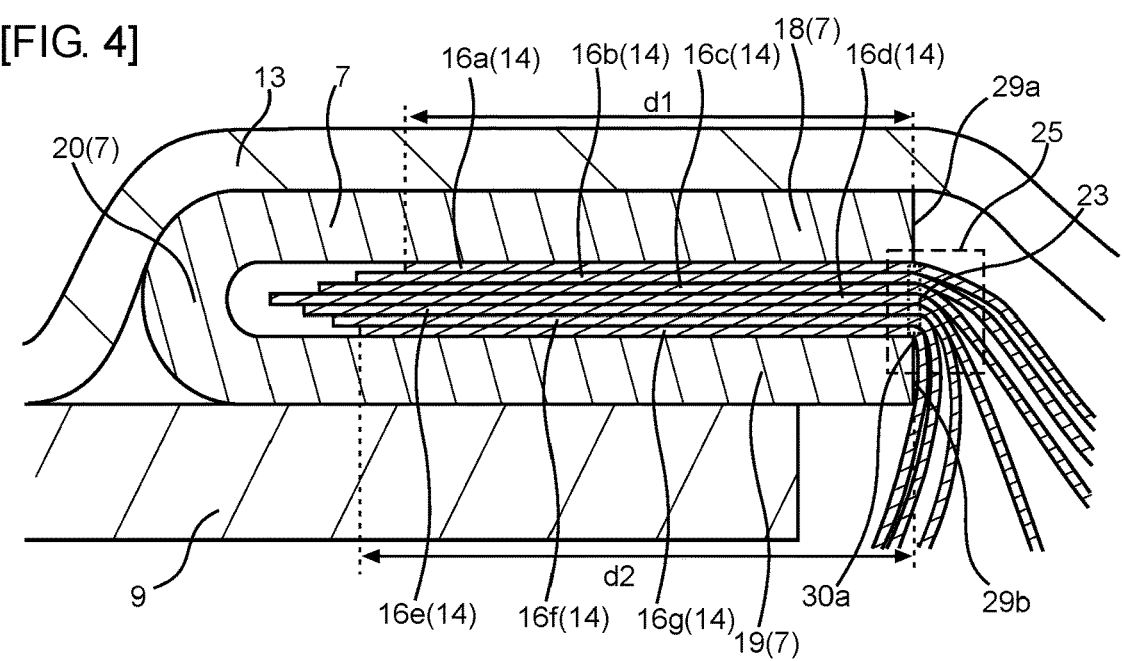

[FIG. 5]
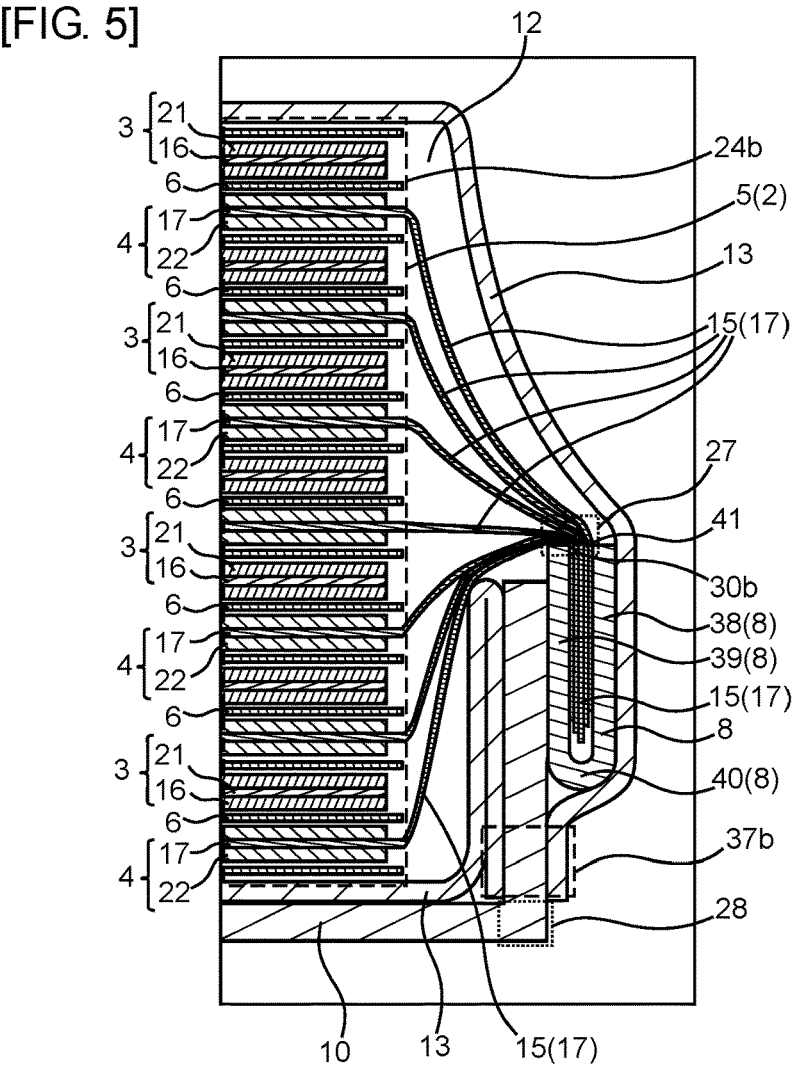
[FIG. 6]
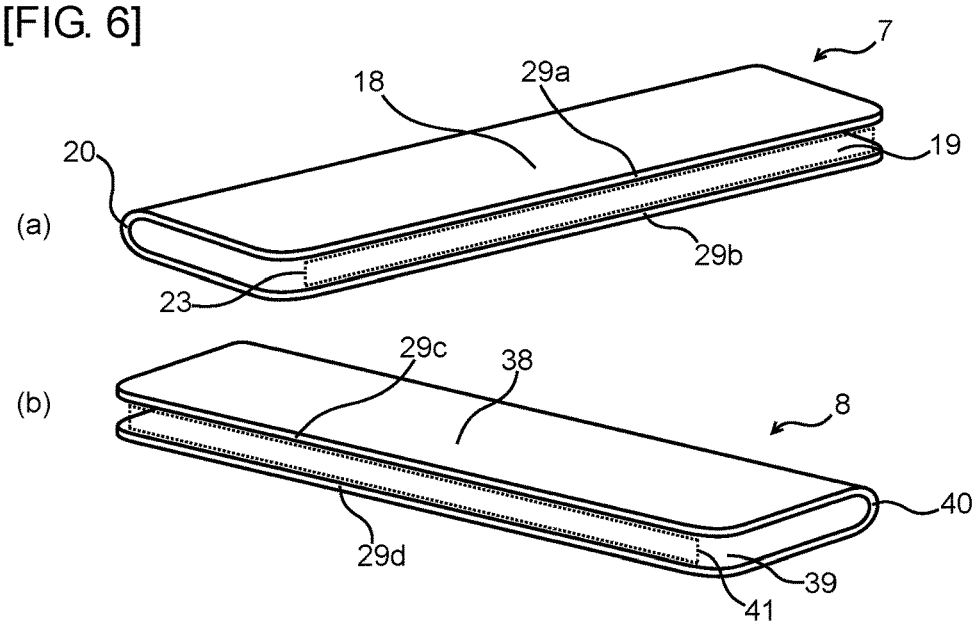

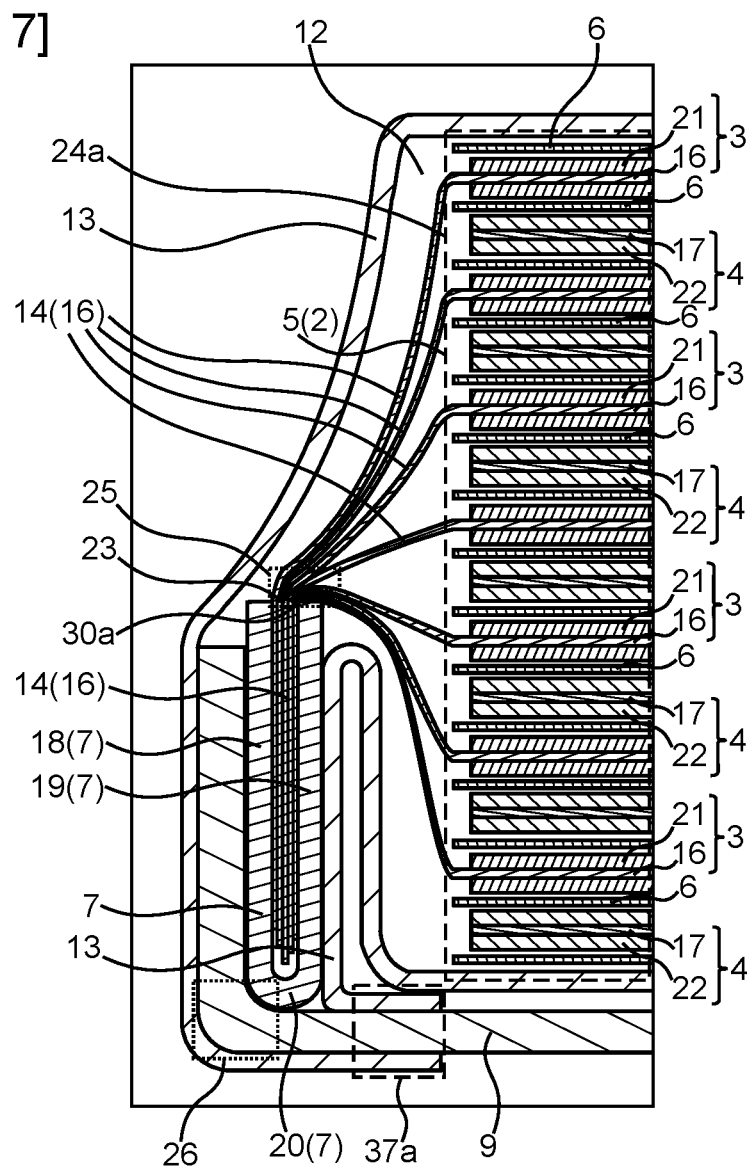

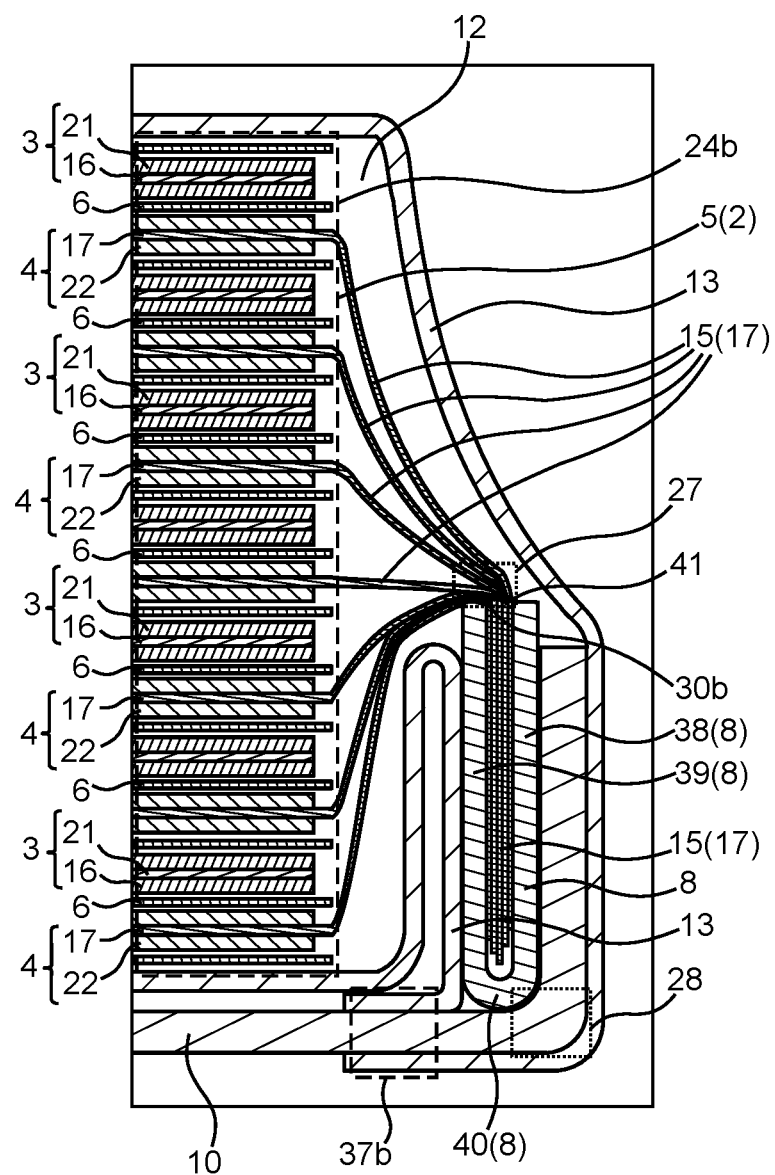

[FIG. 9]
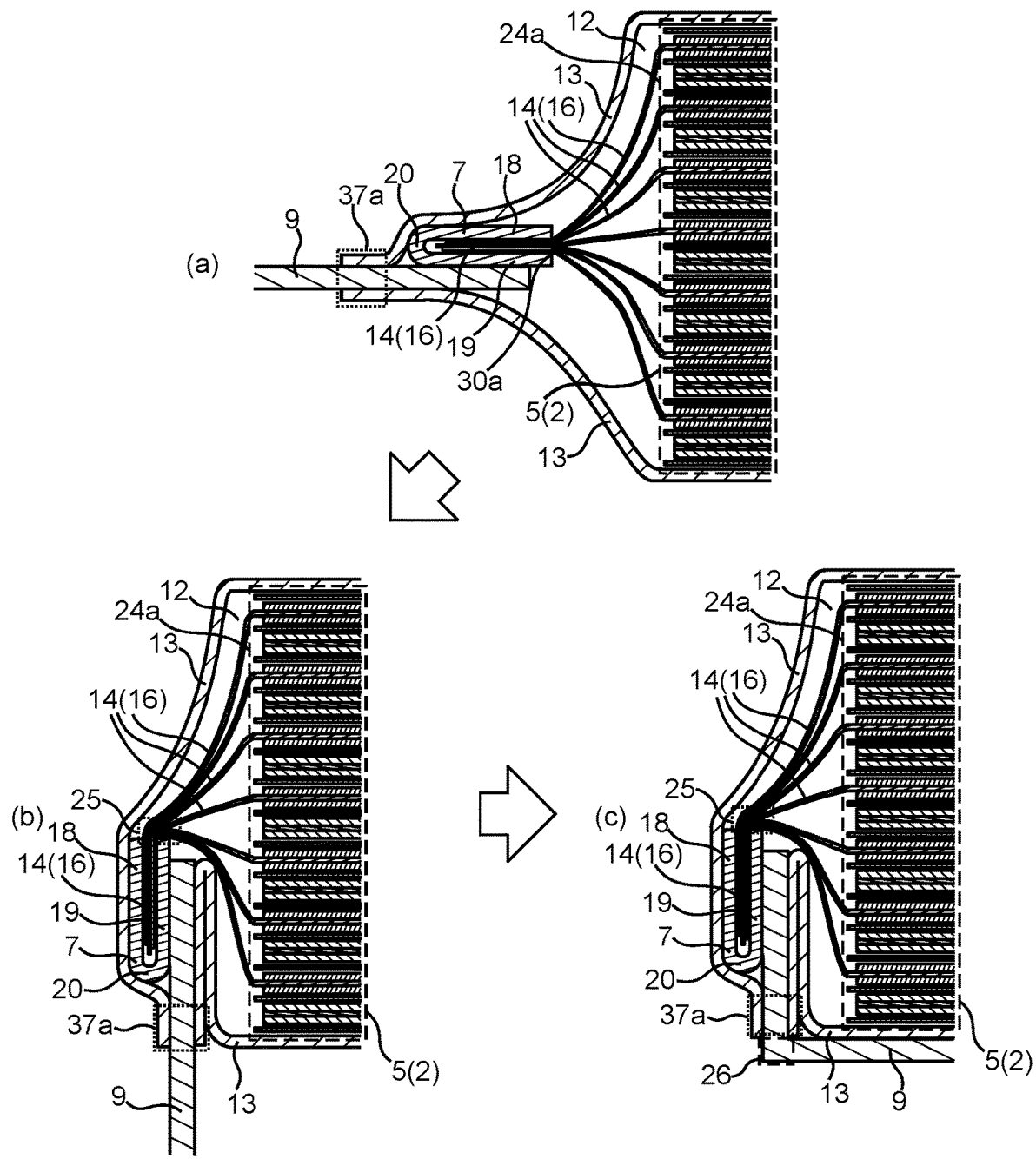

[FIG. 10]
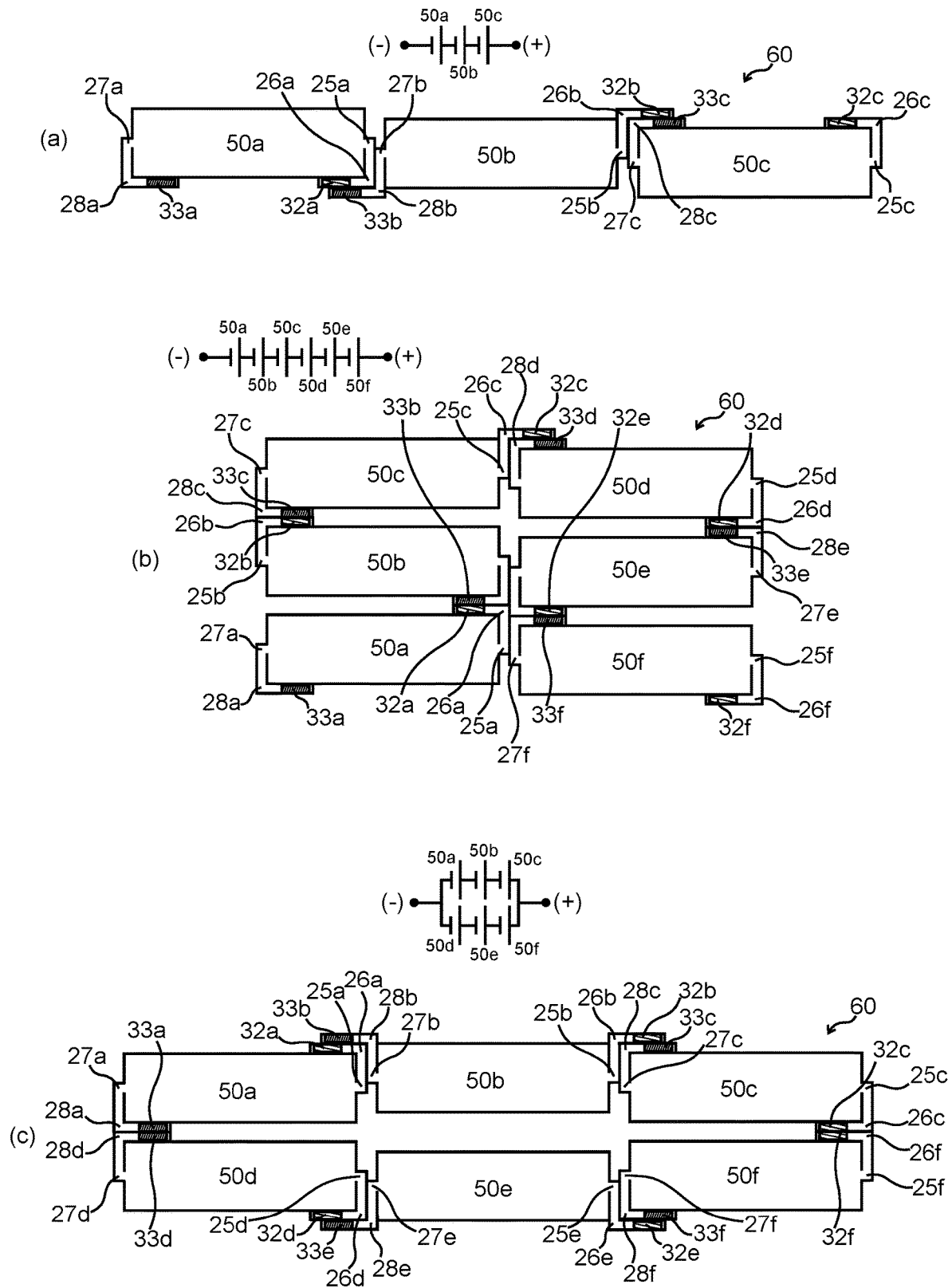

SEALED BATTERY, ASSEMBLED BATTERY, AND METHOD FOR MANUFACTURING SEALED BATTERY

TECHNICAL FIELD

The present invention relates to a sealed battery, an assembled battery, and a method for manufacturing the sealed battery.

BACKGROUND ART

In recent years, batteries have been used for various purposes; and batteries with a large capacity in particular are used for power supply for electric vehicles, electric power storage, and so forth.

In a case where a single battery is used, a voltage of the battery may be lower than a voltage required by an electric device. In such a case, it is necessary to connect two or more batteries in series in order to increase the supply voltage to a desired voltage. In another case, a single battery may not supply as much electric power as required by an electric device. In such a case, it is necessary to connect two or more batteries in parallel in order to increase the supply electric power to a desired quantity.

For this reason, a battery box or an assembled battery in which two or more batteries are connected in series or in parallel is provided; and power is supplied to the electric devices from these batteries. There are some well-known ways of connecting two or more batteries in series or in parallel such as using a bus bar(s) between external terminals (see, for example, PTL 1), and welding folded electrode terminals (see, for example, PTL 2). It has been also known that batteries whose electrode terminals are folded are assembled in a battery pack (see, for example, PTL 3). An assembled battery is also known in which a plurality of current collection sheets stacked on top of each other are folded so that positions of external terminals are changed in order to connect adjacent two batteries with each other (see, for example, PTL 4).

CITATION LIST

Patent Documents

[PTL 1] Japanese Unexamined Patent Application Publication No. 2014-135204
[PTL 2] Japanese Unexamined Patent Application Publication No. 2013-239293
[PTL 3] Japanese Unexamined Patent Application Publication No. 2012-074387
[PTL 4] WO 2016/157370 A1

SUMMARY OF INVENTION

Technical Problems

At the time when the plurality of current collection sheets are stacked and folded, the outer side of the folded portion of the current collection sheets is stretched, while the inner side of the folded portion of the current collection sheets is compressed. The compressed current collection sheets may possibly cause some parts of the current collection sheets to be pushed up and bent in waves. Tensile stress, compressive stress, etc. are applied to the wavily bent parts of the current collection sheets, causing the current collection sheets to be torn. Therefore, if the current collection sheets are bent in waves, it is necessary to redo the folding process in order to make the current collection sheets waveless, leading to an increase in production cost.

The present invention was devised in view of such circumstances, and provides a sealed battery that can prevent current collection sheets from being bent in waves and can be manufactured at low cost.

Solutions to Problems

The present invention provides a sealed battery characterized by comprising: an electrode assembly having a multilayered structure in which at least one positive electrode, at least one negative electrode, and at least one separator are layered; a first clip having first and second plate sections; a first conductive plate joined to the first clip; an electrolyte; and a case housing the electrode assembly, the first clip, and the electrolyte, wherein the positive electrode has a positive-electrode current collection sheet and a positive-electrode active material layer provided on the positive-electrode current collection sheet; the negative electrode has a negative-electrode current collection sheet and a negative-electrode active material layer provided on the negative-electrode current collection sheet; the electrode assembly has the following sections: a positive-electrode extended section which is a layered portion of the positive-electrode current collection sheet and extends from the multilayered structure, and a negative-electrode extended section which is a layered portion of the negative-electrode current collection sheet and extends from the multilayered structure; the first clip is provided in such a way that either one of the positive-electrode extended section and the negative-electrode extended section is sandwiched and fastened between the first plate section and the second plate section, and the first clip has a first gripping opening between an end of the first plate section and an end of the second plate section; and the positive-electrode extended section or the negative-electrode extended section fastened by the first clip has a first fold portion formed by folding the current collection sheet by using the end of the first or second plate section at the first gripping opening as a fulcrum point.

Advantageous Effects of Invention

The electrode assembly has the positive-electrode extended section which is the layered portion of the positive-electrode current collection sheet and extends from the multilayered structure. This makes it easy to electrically connect the positive electrode to a positive-electrode external terminal through the positive-electrode extended section. Also, the electrode assembly has the negative-electrode extended section which is the layered portion of the negative-electrode current collection sheet and extends from the multilayered structure. This makes it easy to electrically connect the negative electrode to a negative-electrode external terminal through the negative-electrode extended section.

The first clip is provided in such a way that either one of the positive-electrode extended section, where the positive-electrode current collection sheet is layered, and the negative-electrode extended section, where the negative-electrode current collection sheet is layered, is sandwiched and fastened between the first plate section and the second plate section. This prevents the positive electrode or the negative electrode in the electrode assembly from deviating from a predetermined position, and prevents internal short-circuit. The portion of the positive-electrode extended section or the negative-electrode extended section fastened with the first clip may be easily integrated by welding.

The first conductive plate is joined to the first clip. This allows the positive-electrode current collection sheet or the negative-electrode current collection sheet to be electrically connected to the first conductive plate through the first clip, and makes it possible to charge and discharge the sealed battery through the first conductive plate.

The positive-electrode extended section (the positive-electrode current collection sheet) or the negative-electrode extended section (the negative-electrode current collection sheet) fastened by the first clip has the first fold portion. This allows the positive-electrode extended section or the negative-electrode extended section to be folded up, and allows the sealed battery to be downsized without changing a charge-discharge capacity thereof.

By having the first fold portion, a position of the first conductive plate can be changed, and a position of the terminal can be changed that is used to connect the sealed battery to another battery, etc. This allows the terminal to be disposed at a desired position.

The first fold portion is formed by folding the layered positive-electrode extended section (the layered positive-electrode current collection sheet) or the layered negative-electrode extended section (the layered negative-electrode current collection sheet) by using the end of the first or second plate section at the first gripping opening of the first clip as the fulcrum point. This prevents the current collection sheet on the inner side of the first fold portion from being bent in a wavelike fashion, and can lower production cost.

By changing a length from the first gripping opening to a back plate section of the first clip, a position of the end portion serving as the fulcrum point can be adjusted, and a position of the first fold portion can be easily adjusted.

Since the positive-electrode extended section or the negative-electrode extended section may be folded by using the end of the first or second plate section as a base point, it becomes possible to accurately fold the positive-electrode extended section or the negative-electrode extended section by machine, to lower the production cost, and to improve quality of a final product.

BRIEF DESCRIPTION OF DRAWINGS

FIG. 1 illustrates a diagrammatic perspective view of a sealed battery in accordance with an embodiment of the present invention.

FIG. 2(a) illustrates a diagrammatic cross-section view of the sealed battery taken along the dashed line A-A of FIG. 1; and FIGS. 2(b) to 2(d) each illustrate a diagrammatic cross-section view of the sealed battery in accordance with an embodiment of the present invention.

FIG. 3 illustrates an enlarged cross-section view of an area B of the sealed battery, which is enclosed by the dashed line in FIG. 2(a).

FIG. 4 illustrates an enlarged cross-section view of an area D of the sealed battery, which is enclosed by the dashed-dotted line in FIG. 3.

FIG. 5 illustrates an enlarged cross-section view of an area C of the sealed battery, which is enclosed by the dashed line in FIG. 2(a).

FIGS. 6(a) and 6(b) each illustrate a diagrammatic perspective view of a clip included in a sealed battery in accordance with an embodiment of the present invention.

FIG. 7 illustrates a partial cross-section view of a sealed battery in accordance with an embodiment of the present invention.

FIG. 8 illustrates a partial cross-section view of a sealed battery in accordance with an embodiment of the present invention.

FIGS. 9(a) to 9(c) illustrate explanatory drawings of how to manufacture a sealed battery in accordance with an embodiment of the present invention.

FIGS. 10(a) to 10(c) each illustrate a diagrammatic view of an assembled battery in accordance with an embodiment of the present invention.

DESCRIPTION OF EMBODIMENTS

A sealed battery of the present invention is characterized by comprising: an electrode assembly having a multilayered structure in which at least one positive electrode, at least one negative electrode, and at least one separator are layered; a first clip having first and second plate sections; a first conductive plate joined to the first clip; an electrolyte; and a case housing the electrode assembly, the first clip, and the electrolyte, wherein the positive electrode has a positive-electrode current collection sheet and a positive-electrode active material layer provided on the positive-electrode current collection sheet; the negative electrode has a negative-electrode current collection sheet and a negative-electrode active material layer provided on the negative-electrode current collection sheet; the electrode assembly has the following sections: a positive-electrode extended section which is a layered portion of the positive-electrode current collection sheet and extends from the multilayered structure, and a negative-electrode extended section which is a layered portion of the negative-electrode current collection sheet and extends from the multilayered structure; the first clip is provided in such a way that either one of the positive-electrode extended section and the negative-electrode extended section is sandwiched and fastened between the first plate section and the second plate section, and the first clip has a first gripping opening between an end of the first plate section and an end of the second plate section; and the positive-electrode extended section or the negative-electrode extended section fastened by the first clip has a first fold portion formed by folding the current collection sheet by using the end of the first or second plate section at the first gripping opening as a fulcrum point.

It is desirable that the electrode assembly included in the sealed battery of the present invention should have a stacked structure or a wound structure.

It is desirable that the first conductive plate included in the sealed battery of the present invention should have a second fold portion formed by folding the first conductive plate; and it is desirable that the second fold portion should be provided in such a way that a part of the first conductive plate overlaps with the positive electrode, the negative electrode, the separator, and the case, or in such a way that the part of the first conductive plate overlaps with a positive electrode, a negative electrode, a separator, and a case included in an adjacent sealed battery. This enables the first conductive plate to be disposed in a gap between the two adjacent sealed batteries or in a gap between the case and the sealed battery, and allows the sealed battery to be downsized. This also enables the external terminal to be easily connected with an external terminal of an adjacent sealed battery, in a case of manufacturing an assembled battery including a plurality of sealed batteries.

It is desirable that the first fold portion should be provided in such a way that the first conductive plate is disposed between the first clip and the multilayered structure.

It is desirable that the first fold portion should be provided in such a way that the first clip is disposed between the first conductive plate and the multilayered structure. It is also desirable that the first clip should have the back plate section that connects the first plate section to the second plate section. It is further desirable that the second fold portion should be formed by folding the first conductive plate by using a corner between the first or second plate section and the back plate section or by using the back plate section, as a fulcrum point. This allows the second fold portion to be easily formed, and can reduce production cost of the sealed battery.

It is desirable that the multilayered structure should have a first side face, at which the positive-electrode extended section is provided, and a second side face, at which the negative-electrode extended section is provided. It is also desirable that the first fold portion should be provided in such a way that the first or second plate section is disposed along the first or second side face of the multilayered structure. By providing the first fold portion in this way, the first clip can be disposed parallel to the first or second side face of the multilayered structure of the electrode assembly; and this makes it possible to minify a space necessary for the section (the first clip) that holds the layered current collection sheet together. This enables the sealed battery to be downsized.

It is desirable that the positive-electrode extended section or the negative-electrode extended section fastened by the first clip should be disposed in such a way that an end of the current collection sheet that is closest to the multilayered structure becomes farther from the first gripping opening than an end of the current collection sheet that is farthest from the multilayered structure. This prevents the inner side of the current collection sheet at the first fold portion from sagging when the first fold portion is formed, and prevents the current collection sheet from being bent in a wavelike fashion. Also, by forming the first fold portion, the positive-electrode active material layer or the negative-electrode active material layer in the electrode assembly can be prevented from deviating from its position.

It is desirable that the first clip should be provided in such a way that the positive-electrode extended section is sandwiched and fastened between the first plate section and the second plate section; and it is desirable that the positive-electrode extended section should have the first fold portion formed by folding the positive-electrode current collection sheet by using the end of the first or second plate section at the first gripping opening as the fulcrum point.

It is desirable that the sealed battery of the present invention should comprise: a second clip having third and fourth plate sections; and a second conductive plate joined to the second clip. It is also desirable that the case should house the electrode assembly, the first clip, the second clip, and the electrolyte. It is also desirable that the second clip should be provided in such a way that the negative-electrode extended section is sandwiched and fastened between the third plate section and the fourth plate section, and the second clip should have a second gripping opening between an end of the third plate section and an end of the fourth plate section. It is further desirable that the negative-electrode extended section should have a third fold portion formed by folding the negative-electrode current collection sheet by using the end of the third or fourth plate section at the second gripping opening as a fulcrum point.

It is desirable that the second conductive plate should have a fourth fold portion formed by folding the second conductive plate. It is also desirable that the fourth fold portion should be provided in such a way that a part of the second conductive plate overlaps with the positive electrode, the negative electrode, the separator, and the case, or in such a way that the part of the second conductive plate overlaps with a positive electrode, a negative electrode, a separator, and a case included in an adjacent sealed battery.

It is desirable that the case should have a pouch structure made of a laminate film. This makes it possible to fold the case at the time of forming the first fold portion and allows the sealed battery to be easily downsized.

The present invention also provides a sealed battery characterized by comprising: an electrode assembly having a multilayered structure in which at least one positive electrode, at least one negative electrode, and at least one separator are layered; a first clip having first and second plate sections; a first conductive plate joined to the first clip; an electrolyte; and a case housing the electrode assembly, the first clip, and the electrolyte, wherein the positive electrode has a positive-electrode current collection sheet and a positive-electrode active material layer provided on the positive-electrode current collection sheet; the negative electrode has a negative-electrode current collection sheet and a negative-electrode active material layer provided on the negative-electrode current collection sheet; the electrode assembly has the following sections: a positive-electrode extended section which is a layered portion of the positive-electrode current collection sheet and extends from the multilayered structure, and a negative-electrode extended section which is a layered portion of the negative-electrode current collection sheet and extends from the multilayered structure; the first clip is provided in such a way that either one of the positive-electrode extended section and the negative-electrode extended section is sandwiched and fastened between the first plate section and the second plate section, and the first clip has a first gripping opening between an end of the first plate section and an end of the second plate section; the positive-electrode extended section or the negative-electrode extended section fastened by the first clip has a first fold portion formed by folding the current collection sheet; the first fold portion is provided in such a way that the first clip is disposed between the first conductive plate and the multilayered structure; the first conductive plate has a second fold portion formed by folding the first conductive plate; the first clip has a back plate section that connects the first plate section to the second plate section; and the second fold portion is formed by folding the first conductive plate by using a corner between the first or second plate section and the back plate section or by using the back plate section, as a fulcrum point.

The present invention also provides an assembled battery in which a plurality of sealed batteries of the present invention are connected in series or in parallel.

The present invention also provides a method for manufacturing the sealed battery, the method comprising forming a first fold portion by folding the positive-electrode extended section or the negative-electrode extended section fastened by a first clip by using an end of a first or second plate section at a first gripping opening of the first clip as a fulcrum point.

The following describes an embodiment of the present invention with reference to the drawings. The configurations illustrated in the drawings and the following description are merely illustrative, and the scope of the present invention is not limited thereto.

FIGS. 1 to 8 are drawings related to a sealed battery according to the present embodiment. Description of each of the drawings is the same as described above. FIGS. 9(a) to 9(c) are explanatory views of a method for producing the sealed battery according to the present embodiment. FIGS. 10(a) to 10(c) are schematic views of an assembled battery according to the present embodiment.

A sealed battery 50 according to the present embodiment includes: an electrode assembly 2 having a multilayered structure 5 in which one or more positive electrodes 3, one or more negative electrodes 4, and one or more separators 6 are layered; a first clip 7 having a first plate section 18 and a second plate section 19; a first conductive plate 9 bonded to the first clip 7; an electrolyte 12; and a case 13 housing the electrode assembly 2, the first clip 7, and the electrolyte 12. The positive electrode 3 has a positive-electrode current collection sheet 16 and a positive-electrode active material layer 21 provided on the positive-electrode current collection sheet 16. The negative electrode 4 has a negative-electrode current collection sheet 17 and a negative-electrode active material layer 22 provided on the negative-electrode current collection sheet 17. The electrode assembly 2 has a positive-electrode extended section 14 which is a layered portion of the positive-electrode current collection sheet 16 and extends from the multilayered structure 5. The electrode assembly 2 also has a negative-electrode extended section 15 which is a layered portion of the negative-electrode current collection sheet 17 and extends from the multilayered structure 5. The first clip 7 is provided in such a way that either one of the positive-electrode extended section 14 and the negative-electrode extended section 15 is sandwiched and fastened between the first plate section 18 and the second plate section 19. The first clip 7 has a first gripping opening 23 between an end 29a of the first plate section 18 and an end 29b of the second plate section 19. The positive-electrode extended section 14 or the negative-electrode extended section 15 fastened by the first clip 7 have a first fold portion 25 formed by folding the current collection sheet 16 or 17 at a fulcrum point. The end 29a of the first plate section 18 or the end 29b of the second plate section 19 at the first gripping opening 23 serves as the fulcrum point.

A method for producing the sealed battery 50 according to the present embodiment produces the sealed battery 50 including: the electrode assembly 2 having the multilayered structure 5 in which the one or more positive electrodes 3, the one or more negative electrodes 4, and the one or more separators 6 are layered; the first clip 7 having the first plate section 18 and the second plate section 19; the first conductive plate 9 bonded to the first clip 7; the electrolyte 12; and the case 13 housing the electrode assembly 2, the first clip 7, and the electrolyte 12. The positive electrode 3 has the positive-electrode current collection sheet 16 and the positive-electrode active material layer 21 provided on the positive-electrode current collection sheet 16. The negative electrode 4 has the negative-electrode current collection sheet 17 and the negative-electrode active material layer 22 provided on the negative-electrode current collection sheet 17. The electrode assembly 2 has the positive-electrode extended section 14 which is a layered portion of the negative-electrode current collection sheet 17 and extends from the multilayered structure 5. The electrode assembly 2 also has the negative-electrode extended section 15 which is a layered portion of the negative-electrode current collection sheet 17 and extends from the multilayered structure 5. The first clip 7 is provided in such a way that either one of the positive-electrode extended section 14 and the negative-electrode extended section 15 is sandwiched and fastened between the first plate section 18 and the second plate section 19. The first clip 7 has the first gripping opening 23 between the end 29a of the first plate section 18 and the end 29b of the second plate section 19. The method includes forming the first fold portion 25 by folding the positive-electrode extended section 14 or the negative-electrode extended section 15 fastened by the first clip 7, at a fulcrum point. The end 29a of the first plate section 18 or the end 29b of the second plate section 19 at the first gripping opening 23 serves as the fulcrum point.

An assembled battery 60 according to the present embodiment includes a plurality of sealed batteries 50 according to the present embodiment that are connected in series or in parallel.

The following describes the sealed battery 50, a production method thereof, and the assembled battery 60 according to the present embodiment.

The sealed battery 50 according to the present embodiment has a sealed structure that seals the electrolyte from ambient air and prevents the electrolyte from leaking during storage or during discharge. The sealed battery 50 according to the present embodiment may be a secondary battery or a non-aqueous electrolyte secondary battery. Examples of the sealed battery 50 according to the present embodiment include lithium-ion batteries, lead-acid batteries, nickel-hydrogen batteries, and nickel-cadmium batteries.

The sealed battery 50 may for example have a flat rectangular parallelepiped shape. In this case, the sealed battery 50 can have wider upper and lower faces with four side faces therearound. The positive-electrode extended section 14 and the negative-electrode extended section 15 may be provided at and within opposed two side faces, respectively, included in the four side faces. A portion of the first conductive plate 9 may be disposed on the case 13 at the upper face or the lower face of the sealed battery 50. Furthermore, a portion of the first conductive plate 9 may form a positive-electrode external terminal 32 by protruding toward a side face (a side face at which neither the positive-electrode extended section 14 nor the negative-electrode extended section 15 is provided) of the sealed battery 50 from a region of contact between the first conductive plate 9 and the case 13. A portion of the second conductive plate 10 may be disposed on the case 13 at the upper face or the lower face of the sealed battery 50. Furthermore, a portion of the second conductive plate 10 may form a negative-electrode external terminal 33 by protruding toward a side face (a side face at which neither the positive-electrode extended section 14 nor the negative-electrode extended section 15 is provided) of the sealed battery 50 from a region of contact between the second conductive plate 10 and the case 13.

The assembled battery 60 according to the present embodiment may be constituted by a plurality of sealed batteries 50. The assembled battery 60 may include the sealed batteries 50 connected in series as shown in, for example, FIGS. 10(a) and 10(b). Alternatively, the assembled battery 60 may include the sealed batteries 50 connected in parallel as shown in, for example, FIG. 10(c).

The case 13 is a casing that houses the electrode assembly 2, the electrolyte 12, and the first clip 7. The case 13 may also house a second clip 8. Examples of materials of the case 13 include a laminate film, plastic, and metal. The case 13 may have a closed space for housing the electrode assembly 2 and the electrolyte 12 therein. In a case where the material of the case 13 is a laminate film, the sealed battery 50 according to the present embodiment is a pouch battery. In this case, the case 13 has, on its peripheral edge, a weld part 36 where the laminate film is layered and welded. The case 31 may also have, on its peripheral edge, a sealing section 37a where the laminate film is attached to opposite surfaces of the first conductive plate 9 and a sealing section 37b where the laminate film is attached to opposite surfaces of the second conductive plate 10. The laminate film is, for example, formed by laminating a resin film onto opposite surfaces of a metal film. The laminate film may have a thickness of 50 μm to 200 μm, for example.

Preferably, the case 13 has a pouch structure made of the laminate film. Such a structure allows the case 13 to be folded when the first fold portion 25 or a third fold portion 27 is formed, easily achieving a reduction in size of the sealed battery 50.

The electrode assembly 2 is formed by stacking the one or more positive electrodes 3, the one or more negative electrodes 4, and the one or more separators 6. The electrode assembly 2 includes the multilayered structure 5, the positive-electrode extended section 14, and the negative-electrode extended section 15. The multilayered structure 5 is a multilayered section of the positive electrode 3, the negative electrode 4, and the separator 6.

The electrode assembly 2 may have a stacked structure in which a plurality of positive electrodes 3, a plurality of negative electrodes 4, and a separator 6 are stacked. In this case, the multilayered structure 5 is a stack of the plurality of positive electrodes 3 and the plurality of negative electrodes 4 alternately stacked with the separator 6 therebetween. In the case of the electrode assembly 2 having the stacked structure, sheet-shaped positive electrodes 3 and sheet-shaped negative electrodes 4 are alternately stacked with the separator therebetween in the structure of the electrode assembly 2. The stacked positive electrodes 3 are separate positive electrodes, and the stacked negative electrodes 4 are separate negative electrodes. An upper face and a lower face of the electrode assembly 2 are faces of the electrode assembly 2 that are substantially parallel to main surfaces of the sheet-shaped positive electrodes 3 or the sheet-shaped negative electrodes 4. Side faces of the electrode assembly 2 are peripheral faces of the electrode assembly 2, other than the upper and lower faces. The positive electrodes 3 included in the electrode assembly 2 may have substantially the same shape, and the negative electrodes 4 included in the electrode assembly 2 may have substantially the same shape. The electrode assembly 2 may for example include a single separator 6 folded in a zigzag fashion, and the positive electrodes 3 and the negative electrodes 4 stacked in an alternating arrangement with the separator 6 therebetween, each of which is disposed in a valley fold of the separator 6. Alternatively, separate separators may be disposed between the positive electrodes 3 and the negative electrodes 4. The number of layers of the positive electrodes 3 and the negative electrodes 4 included in the electrode assembly 2 may be set, as appropriate, according to the required battery capacity. The sealed battery 50 may have a plurality of electrode assemblies 2.

The electrode assembly 2 may alternatively have a wound structure in which the positive electrode 3, the negative electrode 4, and the separator 6 are stacked and wound. In this case, the multilayered structure 5 is a multilayered section of the positive electrode 3, the negative electrode 4, and the separator 6 ranging from the winding axis to the outer periphery. Alternatively, the electrode assembly 2 may have a flattened wound structure.

The electrode assembly 2 has the positive-electrode extended section 14, which is overlapping extension of the positive-electrode current collection sheet 16 projecting from the multilayered structure 5. The positive-electrode extended section 14 only includes the extension of the positive-electrode current collection sheet projecting from the multilayered structure 5. That is, the positive-electrode extended section 14 has no positive-electrode active material layers on the positive-electrode current collection sheet. The positive-electrode current collection sheet overlaps in the positive-electrode extended section 14. The extension projecting from the multilayered structure 5 may be end of the positive-electrode current collection sheet or may be tab provided in the positive-electrode current collection sheet. The positive-electrode extended section 14 may be extension of the positive-electrode current collection sheet 16 projecting from a side face 24a of the multilayered structure 5.

In the case of the electrode assembly having the stacked structure, the positive-electrode extended section 14 is overlapping extensions of the positive-electrode current collection sheets projecting from the respective positive electrodes 3 included in the multilayered structure 5. Neither the negative electrode 4 nor the separator 6 is disposed between any two adjacent positive-electrode current collection sheets in the positive-electrode extended section 14. It is therefore possible to fasten the overlapping positive-electrode current collection sheets using the first clip and electrically connect the positive electrodes included in the multilayered structure 5 with the first clip through the positive-electrode extended section 14.

In the case of the electrode assembly 2 having the wound structure, the positive-electrode extended section 14 is overlapping extension of the positive-electrode current collection sheet projecting from the positive electrode 3 included in the multilayered structure 5 being rolled. Neither the negative electrode 4 nor the separator 6 is disposed between any overlapping positive-electrode current collection sheet in the positive-electrode extended section 14. It is therefore possible to fasten the overlapping positive-electrode current collection sheet using the first clip and electrically connect the positive electrode included in the multilayered structure 5 with the first clip through the positive-electrode extended section 14.

The electrode assembly 2 has the negative-electrode extended section 15, which is overlapping extension of the negative-electrode current collection sheet 17 projecting from the multilayered structure 5. The negative-electrode extended section 15 only includes the extension of the negative-electrode current collection sheet 17 projecting from the multilayered structure 5. That is, the negative-electrode extended section 15 has no negative-electrode active material layers 22 on the negative-electrode current collection sheet 17. The negative-electrode current collection sheet 17 overlaps in the negative-electrode extended section 15. The extension projecting from the multilayered structure 5 may be end of the negative-electrode current collection sheet 17 or may be tab provided in the negative-electrode current collection sheet 17. The negative-electrode extended section 15 may be extension of the negative-electrode current collection sheet 17 projecting from a side face 24b of the multilayered structure 5. The side face 24b having the negative-electrode extended section 15 may be a side face opposite to the side face 24a having the positive-electrode extended section 14.

In the case of the electrode assembly having the stacked structure, the negative-electrode extended section 15 is overlapping extensions of the negative-electrode current collection sheets 17 projecting from the respective negative electrodes 4 included in the multilayered structure 5. Neither the positive electrode 3 nor the separator 6 is disposed between any two adjacent negative-electrode current collection sheets 17 in the negative-electrode extended section 15. It is therefore possible to fasten the overlapping negative-electrode current collection sheets 17 using the second clip 8 and electrically connect the negative electrodes 4 included in the multilayered structure 5 with the second clip 8 through the negative-electrode extended section 15.

In the case of the electrode assembly 2 having the wound structure, the negative-electrode extended section 15 is overlapping extension of the negative-electrode current collection sheet 17 projecting from the negative electrode 4 included in the multilayered structure 5 being rolled. Neither the positive electrode 3 nor the separator 6 is disposed between any overlapping negative-electrode current collection sheet 17 in the negative-electrode extended section 15. It is therefore possible to fasten the overlapping negative-electrode current collection sheet 17 using the second clip 8 and electrically connect the negative electrode 4 included in the multilayered structure 5 with the second clip 8 through the negative-electrode extended section 15.

The separator 6 is sheet-shaped and disposed between the positive electrode 3 and the negative electrode 4. No particular imitations are placed on the separator 6 other than being a separator that can prevent flow of short-circuit current between the positive electrode 3 and the negative electrode 4 and allow the electrolyte to pass therethrough. For example, the separator 6 may be microporous polyolefin or polyethylene film.

The positive electrode 3 includes the positive-electrode current collection sheet 16 and the positive-electrode active material layer 21 provided on the positive-electrode current collection sheet 16. The positive electrode 3 may have a square or rectangular sheet shape. The positive electrode 3 can for example be prepared by forming the positive-electrode active material layer 21 on opposite surfaces of the positive-electrode current collection sheet 16 having a quadrilateral shape. The positive electrode 3 may have a connection section (the positive-electrode current collection sheet 16) that is fastened by the first clip 7. The connection section can be formed by not forming the positive-electrode active material layer 21 on opposite surfaces of an end of the positive-electrode current collection sheet 16 of the positive electrode 3. Alternatively, the connection section can be formed by forming, on one end of the positive-electrode current collection sheet 16, a tab projecting outward from the one end and not forming the positive-electrode active material layer 21 on the tab. The connection section, which is projecting from the multilayered structure 5 of the electrode assembly 2, constitutes the positive-electrode extended section 14. The separator 6 tends to be at least larger than the positive-electrode active material layer 21. Thus, an end of the separator 6 in the electrode assembly 2 can constitute an end of the multilayered structure 5.

No particular limitations are placed on the positive-electrode current collection sheet 16 other than being electrically conductive sheet having surfaces on which the positive-electrode active material layer 21 is formable. For example, the positive-electrode current collection sheet 16 is metal foil. Preferably, the positive-electrode current collection sheet 16 is aluminum foil. The positive-electrode current collection sheet 16 has a thickness of 10 μm to 40 μm, for example.

The positive-electrode active material layer 21 can be formed on the positive-electrode current collection sheet 16 by adding a conductive agent and a binder to a positive-electrode active material, and applying the resultant mixture onto the positive-electrode current collection sheet 16 by a certain application method. The positive-electrode active material is, for example, a lithium transition metal composite oxide capable of reversible intercalation and deintercalation of lithium ions. Specific examples of positive-electrode active materials that can be used include $LiCoO_2$, $LiNiO_2$, $LiNi_xCo_{1-x}O_2$ (x=0.01-0.99), $LiMnO_2$, $LiMn_2O_4$, $LiCo_xMn_yNi_zO_2$ (x+y+z=1), and olivine-type $LiFePO_4$ and $Li_xFe_{1-y}M_yPO_4$ (with the proviso that 0.05≤x≤1.2, 0≤y≤0.8, and M is at least one of Mn, Cr, Co, Cu, Ni, V, Mo, Ti, Zn, Al, Ga, Mg, B, and Nb). One of these materials can be used independently, or two or more of the materials can be used as a mixture.

The negative electrode 4 includes the negative-electrode current collection sheet 17 and the negative-electrode active material layer 22 provided on the negative-electrode current collection sheet 17. The negative electrode 4 may have a square or rectangular sheet shape. The negative electrode 4 can for example be prepared by forming the negative-electrode active material layer 22 on opposite surfaces of the negative-electrode current collection sheet 17 having a quadrilateral shape. The negative electrode 4 may have a connection section (the negative-electrode current collection sheet 17) that is fastened by the second clip 8. The connection section can be formed by not forming the negative-electrode active material layer 22 on opposite surfaces of an end of the negative-electrode current collection sheet 17 of the negative electrode 4. Alternatively, the connection section can be formed by forming a tab on one end of the negative-electrode current collection sheet 17 and not forming the negative-electrode active material layer 22 on the tab. The connection section, which is projecting from the multilayered structure 5 of the electrode assembly 2, constitutes the negative-electrode extended section 15. The separator 6 tends to be at least larger than the negative-electrode active material layers 22. Thus, an end of the separator 6 in the electrode assembly 2 can constitutes an end of the multilayered structure 5.

Herein, the embodiment has been described in which the connection section (the positive-electrode extended section 14) of the positive-electrode current collection sheet 16 is fastened by the first clip 7 and the connection section (the negative-electrode extended section 15) of the negative-electrode current collection sheet 17 is fastened by the second clip 8. However, other embodiments are possible in which one of the connection section (the positive-electrode extended section 14) of the positive-electrode current collection sheet 16 and the connection section (the negative-electrode extended section 15) of the negative-electrode current collection sheet 17 is fastened by the first clip 7, and the other is not fastened by a clip. The same is true for other portions of the present description.

No particular limitations are placed on the negative-electrode current collection sheet 17 other than being electrically conductive sheet having surfaces on which the negative-electrode active material layer 22 is formable. For example, the negative-electrode current collection sheet 17 is metal foil. Preferably, the negative-electrode current collection sheet 17 is copper foil. The negative-electrode current collection sheet 17 has a thickness of 10 μm to 40 μm, for example.

The negative-electrode active material layer 22 can be formed on the negative-electrode current collection sheet 17 by adding a conductive agent and a binder to a negative-electrode active material and applying the resultant mixture onto the negative-electrode current collection sheet 17 by a certain application method. Examples of negative-electrode active materials that can be used for lithium ion secondary batteries include graphite, partially graphitized carbon, hard carbon, soft carbon, $LiTiO_4$, and Sn alloys. One of these materials can be used independently, or two or more of the materials can be used as a mixture.

The electrolyte 12 contains a solvent, and examples thereof include carbonates, lactones, ethers, and esters. Two or more of these solvents can be used as a mixture. Particularly preferably, among these solvents, a mixture of a cyclic carbonate and a chain carbonate is used. The electrolyte 12 is, for example, a solution prepared by dissolving a lithium salt solute such as $LiCF_3SO_3$, $LiAsF_6$, $LiClO_4$, $LiBF_4$, $LiPF_6$, LiBOB, $LiN(CF_3SO_2)_2$, or $LiN(C_2F_5SO_2)$ in an organic solvent. The electrolyte 12 may be blended with a single additive or a mixture of a plurality of additives as necessary. Examples of additives include VC (vinylene carbonate), PS (propane sultone), VEC (vinyl ethylene carbonate), PRS (propene sultone), and flame retardants.

The first clip 7 has the first plate section 18 and the second plate section 19. The first clip 7 also has the first gripping opening 23 between the end 29a of the first plate section 18 and the end 29b of the second plate section 19. The first clip 7 may also have a first back plate section 20 connecting the first plate section 18 and the second plate section 19. The first back plate section 20 may be provided at an end opposite to the first gripping opening 23. The first clip 7 may include a metal plate curved into a U-shape or a cornered U-shape. The end 29a or the end 29b forming the first gripping opening 23 may be a linear end. The overlapping positive-electrode current collection sheets 16 (the positive-electrode extended section 14) can be bent along the linear end, forming the first fold portion 25. The first clip 7 may for example be a metal plate curved into a U-shape as shown in FIG. 6(a). Corners between the linear end 29a or 29b and lateral ends of the first clip 7 may be round or sharp.

The second clip 8 has a third plate section 38 and a fourth plate section 39. The second clip 8 also has a second gripping opening 41 between an end 29c of the third plate section 38 and an end 29d of the fourth plate section 39. The second clip 8 may also have a second back plate section 40 connecting the third plate section 38 and the fourth plate section 39. The second back plate section 40 may be provided at an end opposite to the second gripping opening 41. The second clip 8 may include a metal plate curved into a U-shape or a cornered U-shape. The end 29c or the end 29d forming the second gripping opening 41 may be a linear end. The overlapping negative-electrode current collection sheets 17 (the negative-electrode extended section 15) can be bent along the linear end, forming the third fold portion 27. The second clip 8 may for example be a metal plate curved into a U-shape as shown in FIG. 6(b). Corners between the linear end 29c or 29d and lateral ends of the second clip 8 may be round or sharp.

The first clip 7 is provided so as to grip and fasten the positive-electrode current collection sheets 16 at the overlapping extensions (the connection sections, the positive-electrode extended section 14) thereof having no positive-electrode active material layers 21. Likewise, the second clip 8 is provided so as to grip and fasten the negative-electrode current collection sheets 17 at the overlapping extensions (the connection sections, the negative-electrode extended section 15) thereof having no negative-electrode active material layers 22.

The first clip 7 may include a plurality of clips. In this case, the plurality of clips grips and fastens the layered positive-electrode extended section 14. The first fold portion 25 is formed by folding the positive-electrode extended section 14 at a fulcrum point, which in this case is the end of the first plate section 18 or the second plate section 19 at the first gripping opening 23 of the clip that has the shortest distance between the first gripping opening 23 thereof and the multilayered structure 5 of the electrode assembly 2 among the plurality of clips.

The second clip 8 may include a plurality of clips. In this case, the plurality of clips grips and fastens the layered negative-electrode extended section 15. The third fold portion 27 is formed by folding the negative-electrode extended section 15 at a fulcrum point, which in this case is the end of the third plate section 38 or the fourth plate section 39 at the second gripping opening 41 of the clip that has the shortest distance between the second gripping opening 41 thereof and the multilayered structure 5 of the electrode assembly 2 among the plurality of clips.

The first clip 7 may be located adjacent to the side face 24a of the multilayered structure 5 of the electrode assembly 2 to fasten the overlapping connection sections (the positive-electrode extended section 14) of the positive-electrode current collection sheets 16, and the second clip 8 may be located adjacent to the side face 24b of the multilayered structure 5 of the electrode assembly 2 to fasten the overlapping connection sections (the negative-electrode extended section 15) of the negative-electrode current collection sheets 17. The multilayered structure 5 of the electrode assembly 2 may be disposed between the first clip 7 and the second clip 8.

The first clip 7 and the overlapping positive-electrode current collection sheets 16 fastened thereby or the second clip 8 and the overlapping negative-electrode current collection sheets 17 fastened thereby may be integrated through welding. For example, the first clip 7 and the overlapping positive-electrode current collection sheets 16 fastened thereby or the second clip 8 and the overlapping negative-electrode current collection sheets 17 fastened thereby may be integrated through ultrasonic welding.

The first clip 7 or the second clip 8 is made of an electrically conductive material. This allows the sealed battery 50 to be charged and discharged through the first clip 7 or the second clip 8.

In a case where the positive-electrode current collection sheets 16 are aluminum foils, the first clip 7 that fastens the positive-electrode current collection sheets 16 may be an aluminum plate. This allows the first clip 7 and the positive-electrode current collection sheets 16 to be readily integrated. This also allows a reduction in contact resistance between the first clip 7 and the positive-electrode current collection sheets 16, reducing internal resistance of the sealed battery 50.

In a case where the negative-electrode current collection sheets 17 are copper foils, the second clip 8 that fastens the negative-electrode current collection sheets 17 may be a copper plate. This allows the second clip 8 and the negative-electrode current collection sheets 17 to be readily integrated. This also allows a reduction in contact resistance between the second clip 8 and the negative-electrode current collection sheets 17, reducing internal resistance of the sealed battery 50.

In the case of the first clip 7 and the second clip 8 being metal plates, these metal plates may have a thickness of 100 μm to 500 μm, for example.

The first conductive plate 9 is bonded to the first clip 7. The first conductive plate 9 can be bonded to the first clip 7 by overlaying the first conductive plate 9 on the first clip 7 and performing welding thereon. For example, the first conductive plate 9 can be bonded to the first clip 7 through ultrasonic welding. Furthermore, the first clip 7, the overlapping positive-electrode current collection sheets 16 fastened by the first clip 7, and the first conductive plate 9 may be integrated through ultrasonic welding. The first conductive plate 9 can be bonded to the first clip 7 so as to be overlaid on a main outer surface of the first clip 7.

In a case where the materials of the positive-electrode current collection sheets 16 and the first clip 7 are aluminum, the first conductive plate 9 may be an aluminum plate. The first conductive plate 9 may have a thickness of 100 μm to 500 μm, for example.

The first conductive plate 9 and the case 13 may form the sealing section 37*a* where the case 13 is attached to the first conductive plate 9. The sealing section 37*a*, the weld part 36, and the sealing section 37*b* form the peripheral edges of the case 13, and these peripheral edges form a closed space within the case 13 in which the electrode assembly 2, the electrolyte 12, the first clip 7, and the second clip 8 are disposed. Provision of the sealing section 37*a* enables the electrode assembly 2 disposed inside the closed space and the external terminal 32 disposed outside the closed space to be electrically connected to each other through the first conductive plate 9, so that the sealed battery 50 can be charged and discharged through the first conductive plate 9.

The first conductive plate 9 may have the positive-electrode external terminal 32. The positive-electrode external terminal 32 is a positive-electrode terminal of the sealed battery 50 and is a part to be connected with an external terminal of another sealed battery 50 or a terminal of a device. The positive-electrode external terminal 32 is disposed outside the case 13. The positive-electrode external terminal 32 may for example be provided as a tab of the first conductive plate 9. For example, the positive-electrode external terminal 32 may be provided as shown in the sealed battery 50 illustrated in FIG. 1.

The second conductive plate 10 is bonded to the second clip 8. The second conductive plate 10 can be bonded to the second clip 8 by overlaying the second conductive plate 10 on the second clip 8 and performing welding thereon. For example, the second conductive plate 10 is bonded to the second clip 8 through ultrasonic welding. Furthermore, the second clip 8, the overlapping negative-electrode current collection sheets 17 fastened by the second clip 8, and the second conductive plate 10 may be integrated through ultrasonic welding. The second conductive plate 10 can be bonded to the second clip 8 so as to be overlaid on a main outer surface of the second clip 8.

In a case where the materials of the negative-electrode current collection sheets 17 and the second clip 8 are copper, the second conductive plate 10 may be a copper plate. The second conductive plate 10 may have a thickness of 100 μm to 500 μm, for example.

The second conductive plate 10 and the case 13 may form the sealing section 37*b* where the case 13 is attached to the second conductive plate 10. The sealing section 37*b*, the weld part 36, and the sealing section 37*a* form the peripheral edges of the case 13, and these peripheral edges form the closed space within the case 13 in which the electrode assembly 2, the electrolyte 12, the first clip 7, and the second clip 8 are disposed. Provision of the sealing section 37*b* enables the second conductive plate 10 to extend out of the closed space, so that the sealed battery 50 can be charged and discharged through the second conductive plate 10.

The second conductive plate 10 may have the negative-electrode external terminal 33. The negative-electrode external terminal 33 is a negative-electrode terminal of the sealed battery 50 and is a part to be connected with an external terminal of another sealed battery 50 or a terminal of a device. The negative-electrode external terminal 33 is disposed outside the case 13. The negative-electrode external terminal 33 may for example be provided as a tab of the second conductive plate 10. For example, the negative-electrode external terminal 33 may be provided as shown in the sealed battery 50 illustrated in FIG. 1.

The sealing section 37*a* may be provided with an adhesive layer between the first conductive plate 9 and the case 13. The sealing section 37*b* may be provided with an adhesive layer between the second conductive plate 10 and the case 13. These adhesive layers prevent leakage of the electrolyte 12 from the sealing sections 37*a* and 37*b*. The adhesive layers may each be a bonding tape or an adhesive agent layer. Alternatively, the first conductive plate 9 and the case 13 may be welded or fused together in the sealing section 37*a*, and the second conductive plate 10 and the case 13 may be welded or fused together in the sealing section 37*b*.

The positive-electrode extended section 14 (the positive-electrode current collection sheets 16) fastened by the first clip 7 may have the first fold portion 25 formed by folding the overlapping positive-electrode current collection sheets 16 at a fulcrum point 30*a*, which is the end 29*a* of the first plate section 18 or the end 29*b* of the second plate section 19 at the first gripping opening 23. Likewise, the negative-electrode extended section 15 (the negative-electrode current collection sheets 17) fastened by the second clip 8 may have the third fold portion 27 formed by folding the overlapping negative-electrode current collection sheets 17 at a fulcrum point 30*b*, which is the end 29*c* of the third plate section 38 or the end 29*d* of the fourth plate section 39 at the second gripping opening 41. Through provision of the first fold portion 25 and the third fold portion 27, it is possible to fold the extensions (the positive-electrode extended section 14), on which no positive-electrode active material layers 21 are formed, of the positive-electrode current collection sheets 16 and the extensions (the negative-electrode extended section 15), on which no negative-electrode active material layers 22 are formed, of the negative-electrode current collection sheets 17, achieving a reduction in size of the sealed battery 50.

Preferably, the first fold portion 25 is formed by folding the overlapping positive-electrode current collection sheets 16 at, as the fulcrum point 30*a*, the linear end 29*a* of the first plate section 18 or the linear end 29*b* of the second plate section 19 at the first gripping opening 23. This allows the overlapping positive-electrode current collection sheets 16 to be folded along the linear end 29*a* or 29*b* and restricts the positive-electrode external terminal 32 from becoming out of its desired position. This also prevents undesired overlapping or twisting of the positive-electrode current collection sheets 16.

Preferably, the third fold portion 27 is formed by folding the overlapping negative-electrode current collection sheets 17 at, as the fulcrum point 30*b*, the linear end 29*c* of the third plate section 38 or the linear end 29*d* of the fourth plate section 39 at the second gripping opening 41. This allows the overlapping negative-electrode current collection sheets 17 to be folded along the linear end 29*c* or 29*d* and restricts the negative-electrode external terminal 33 from becoming out of its desired position. This also prevents undesired overlapping or twisting of the negative-electrode current collection sheets 17.

The first fold portion 25 may be provided such that the first clip 7 (the first plate section 18 or the second plate section 19) is disposed along the side face 24*a* of the multilayered structure 5 of the electrode assembly 2, the side face 24*a* having the positive-electrode extended section 14. The third fold portion 27 may be provided such that the second clip 8 (the third plate section 38 or the fourth plate section 39) is disposed along the side face 24*b* of the multilayered structure 5 of the electrode assembly 2, the side face 24*b* having the negative-electrode extended section 15. Through provision of the first and third fold portions 25 and 27 as described above, it is possible to dispose the first and second clips 7 and 8 substantially parallel to the side faces 24*a* and 24*b* of the multilayered structure 5 of the electrode assembly 2, thereby reducing a space for a part (the first clip 7) that bundles the overlapping positive-electrode current collection sheets 16 and a space for a part (the second clip 8) that bundles the overlapping negative-electrode current collection sheets 17. Thus, a reduction in size of the sealed battery 50 is achieved.

The first fold portion 25 can for example be provided as shown in FIGS. 2(*a*), 3, and 4. The third fold portion 27 can for example be provided as shown in FIGS. 2(*a*) and 5.

The first fold portion 25 illustrated in FIGS. 2(*a*), 3, and 4 can for example be formed as illustrated in FIGS. 9(*a*) and 9(*b*). First, the sealed battery 50 as illustrated in FIG. 9(*a*) is formed. In this battery, the first clip 7 is disposed such that the positive electrodes 3 and the negative electrodes 4 forming the multilayered structure 5 of the electrode assembly 2 are substantially parallel to the first plate section 18 or the second plate section 19 of the first clip 7. As a result, it is possible to readily perform following steps such as a step of fastening the positive-electrode extended section 14 (the overlapping positive-electrode current collection sheets 16) using the first clip 7, a step of bonding the first conductive plate 9 to the first clip 7, and a step of forming the sealing section 37*a*.

Next, as illustrated in FIG. 9(*b*), the first fold portion 25 is formed by folding the positive-electrode extended section 14 (the overlapping positive-electrode current collection sheets 16) at, as the fulcrum point 30*a*, the end 29 of the first clip 7 at the first gripping opening 23, and thus the first clip 7 is disposed along the side face of the multilayered structure 5 of the electrode assembly 2. Through formation of the first fold portion 25 as described above, it is possible to fold the positive-electrode extended section 14 while preventing inner ones of the positive-electrode current collection sheets 16 in the first fold portion 25 from being bent in a wavelike fashion. As a result, a reduction in size of the sealed battery 50 is achieved. Furthermore, the position of the positive-electrode external terminal 32 is changeable, and thus the positive-electrode external terminal 32 can be disposed in a desired position.

The position of the end 29*a* or 29*b* serving as the fulcrum point 30*a* can also be adjusted by adjusting the distance from the first gripping opening 23 of the first clip 7 to the first back plate section 20, and thus the position of the first fold portion 25 can be readily adjusted.

Furthermore, since the positive-electrode extended section 14 (the overlapping positive-electrode current collection sheets 16) can be fold based on the end 29*a* or 29*b* of the first clip 7, it is possible to precisely fold the positive-electrode extended section 14 using a machine. Thus, a reduction in production costs and an improvement in quality of a finished product are achieved.

The first fold portion 25 may be formed after a second fold portion 26 has been formed.

The description of the first fold portion 25 herein also applies to the third fold portion 27.

The first fold portion 25 may be provided such that the first conductive plate 9 is located between the first clip 7 and the side face 24*a* (the side face having the positive-electrode extended section 14) of the multilayered structure 5 of the electrode assembly 2. For example, the first fold portion 25 can be provided as shown in FIGS. 2(*a*), 3, and 4. Alternatively, the first fold portion 25 may be provided such that the first clip 7 is located between the first conductive plate 9 and the side face 24*a* of the multilayered structure 5. For example, the first fold portion 25 can be provided as shown in FIG. 7.

The third fold portion 27 may be provided such that the second conductive plate 10 is located between the second clip 8 and the side face 24*b* (the side face having the negative-electrode extended section 15) of the multilayered structure 5 of the electrode assembly 2. For example, the third fold portion 27 can be provided as shown in FIGS. 2(*a*) and 5. Alternatively, the third fold portion 27 may be provided such that the second clip 8 is located between the second conductive plate 10 and the side face 24*b* of the multilayered structure 5. For example, the third fold portion 27 can be provided as shown in FIG. 8.

A folding direction of the positive-electrode current collection sheets 16 (the positive-electrode extended section 14) in the first fold portion 25 may be the same as a folding direction of the negative-electrode current collection sheets 17 (the negative-electrode extended section 15) in the third fold portion 27 as shown in FIG. 2(*a*). Alternatively, the folding direction of the positive-electrode extended section 14 in the first fold portion 25 may be opposite to the folding direction of the negative-electrode extended section 15 in the third fold portion 27 as shown in FIGS. 2(*b*) to 2(*d*). The folding directions of the first fold portion 25 and the third fold portion 27 are determined on the basis of the desired positions of the positive-electrode external terminal 32 and the negative-electrode external terminal 33.

The positive-electrode extended section 14 (the overlapping positive-electrode current collection sheets 16) may be disposed and gripped by the first clip 7 such that an end of the positive-electrode current collection sheet 16 that is closest to the side face 24*a* (the side face having the positive-electrode extended section 14) of the multilayered structure 5 of the electrode assembly 2 is farther from the first gripping opening 23 than an end of the positive-electrode current collection sheet 16 that is farthest from the side face 24*a* of the multilayered structure 5. The negative-electrode extended section 15 (the overlapping negative-electrode current collection sheets 17) may be disposed and gripped by the second clip 8 such that an end of the negative-electrode current collection sheet 17 that is closest to the side face 24*b* (the side face having the negative-electrode extended section 15) of the multilayered structure 5 of the electrode assembly 2 is farther from the second gripping opening 41 than an end of the negative-electrode current collection sheet 17 that is farthest from the side face 24*b* of the multilayered structure 5.

Such a configuration prevents the inner current collection sheets 16 and 17 in the folds 25 and 27 from sagging when the folds 25 and 27 are formed, preventing the current collection sheets 16 and 17 from being bent in a wavelike fashion. Furthermore, as a result of the folds 25 and 27 being formed, the positive-electrode active material layers 21 and the negative-electrode active material layers 22 in the multilayered structure 5 of the electrode assembly 2 can be prevented from becoming out of their desired positions.

For example, overlapping positive-electrode current collection sheets 16*a* to 16*g* may be gripped by the first clip 7 as shown in FIG. 4. A distance d2 between the first gripping opening 23 and an end of the positive-electrode current collection sheet 16*g* that is closest to the side face 24*a* of the multilayered structure 5 of the electrode assembly 2 can be longer than a distance d1 between the first gripping opening 23 and an end of the positive-electrode current collection sheet 16*a* that is farthest from the side face 24*a* of the multilayered structure 5. Thus, the positive-electrode current collection sheet 16*g* can be shorter than the positive-electrode current collection sheet 16*a* in terms of the length from the first gripping opening 23 of the first clip 7 to the multilayered structure 5. This prevents the positive-electrode current collection sheet 16*g* from being bent in a wavelike fashion when the first fold portion 25 is formed and prevents the positive-electrode active material layer 21 on the positive-electrode current collection sheet 16*a* in the multilayered structure 5 of the electrode assembly 2 from becoming out of its desired position.

Note that the positive electrodes 3 included in the electrode assembly 2 may have substantially the same shape, and the negative electrodes 4 included in the electrode assembly 2 may have substantially the same shape.

The first conductive plate 9 may have the second fold portion 26 formed by folding the first conductive plate 9. According to this configuration, the position of the positive-electrode external terminal 32 is changeable through two fold portions—the first fold portion 25 and the second fold portion 26, and thus the positive-electrode external terminal 32 can be disposed in a desired position. Furthermore, two adjacent sealed batteries 50 can accommodate the first conductive plate 9 in a gap therebetween, or a container and a sealed battery 50 can accommodate the first conductive plate 9 in a gap therebetween, achieving a reduction in size of each sealed battery 50.

The second fold portion 26 can for example be formed by folding the first conductive plate 9 as illustrated in FIGS. 9(*b*) and 9(*c*). The second fold portion 26 may be formed by folding the first conductive plate 9 before the first fold portion 25 is formed.

In a case where the first conductive plate 9 has the second fold portion 26, the first fold portion 25 may be formed at a location other than the end of the first plate section 18 or the end of the second plate section 19.

The second fold portion 26 may be provided such that a portion of the first conductive plate 9 overlaps the positive electrodes 3, the negative electrodes 4, the separators 6, and the case 13.

Such a configuration allows two adjacent sealed batteries 50 or a container and a sealed battery 50 to accommodate the first conductive plate 9 in a gap therebetween, achieving a reduction in size of each sealed battery 50. Furthermore, in formation of the assembled battery 60 using a plurality of sealed batteries 50, the positive-electrode external terminals 32 of the sealed batteries 50 can be readily connected with external terminals of their adjacent sealed batteries 50. For example, the second fold portion 26 may be provided as shown in FIGS. 2(*a*) and 3. The second fold portion 26 may be provided such that a portion of the first conductive plate 9 is located on the upper face or the lower face of the electrode assembly 2.

The second fold portion 26 may be provided such that a portion of the first conductive plate 9 is to overlap the positive electrodes 3, the negative electrodes 4, the separators 6, and the case 13 included in an adjacent sealed battery 50. Such a configuration allows two adjacent sealed batteries 50 to be electrically connected to each other readily. For example, the second fold portion 26 may be provided as shown in the sealed battery 50 illustrated in FIG. 2(*d*). That is, as shown in a sealed battery 50*b* included in the assembled battery 60 illustrated in FIG. 10(*a*), the second fold portion 26 may be provided such that a portion of the first conductive plate 9 overlaps the positive electrodes 3, the negative electrodes 4, the separators 6, and the case 13 of a sealed battery 50*c*. Alternatively, the second fold portion 26 may be provided such that a portion of the first conductive plate 9 is to be located on the upper face or the lower face of the electrode assembly 2 included in an adjacent sealed battery 50.

In a case where the first fold portion 25 is provided such that the first clip 7 is located between the first conductive plate 9 and the side face 24 of the multilayered structure 5, the second fold portion 26 can be formed by folding the first conductive plate 9 along an edge between the first back plate section 20 and the first plate section 18 or the second plate section 19 of the first clip 7, or along the first back plate section 20. Thus, it is possible to readily form the second fold portion 26, achieving a reduction in production costs of the sealed battery 50. In this case, the second fold portion 26 can be formed as shown in FIG. 7. In a case where the first back plate section 20 of the first clip 7 has a cornered U-shape, for example, the second fold portion 26 can be formed by folding the first conductive plate 9 along the edge between the first back plate section 20 and the first plate section 18 or the second plate section 19 of the first clip 7. In a case where the first back plate section 20 of the first clip 7 has a U-shape, for example, the second fold portion 26 can be formed by folding the first conductive plate 9 along the first back plate section 20.

The second conductive plate 10 may have a fourth fold portion 28 formed by folding the second conductive plate 10. According to this configuration, the position of the negative-electrode external terminal 33 is changeable through two fold portions—the third fold portion 27 and the fourth fold portion 28, and thus the negative-electrode external terminal 33 can be disposed in a desired position. Furthermore, two adjacent sealed batteries 50 can accommodate the second conductive plate 10 in a gap therebetween, or a container and a sealed battery 50 can accommodate the second conductive plate 10 in a gap therebetween, achieving a reduction in size of each sealed battery 50.

The fourth fold portion 28 may be provided such that a portion of the second conductive plate 10 overlaps the positive electrodes 3, the negative electrodes 4, the separators 6, and the case 13. Such a configuration allows two adjacent sealed batteries 50 or a container and a sealed battery 50 to accommodate the second conductive plate 10 in a gap therebetween, achieving a reduction in size of each sealed battery 50. Furthermore, in formation of the assembled battery 60 using a plurality of sealed batteries 50, the negative-electrode external terminals 33 of the sealed batteries 50 can be readily connected with external terminals of their adjacent sealed batteries 50. For example, the fourth fold portion 28 may be provided as shown in FIGS. 2(*a*) and 3. The fourth fold portion 28 may be provided such that a portion of the second conductive plate 10 is located on the upper face or the lower face of the electrode assembly 2.

The fourth fold portion 28 may be provided such that a portion of the second conductive plate 10 is to overlap the positive electrodes 3, the negative electrodes 4, the separators 6, and the case 13 included in an adjacent sealed battery 50. Such a configuration allows two adjacent sealed batteries 50 to be electrically connected to each other readily. For example, the fourth fold portion 28 may be provided as shown in the sealed battery 50 illustrated in FIG. 2(*d*). That is, as shown in the sealed battery 50*b* included in the assembled battery 60 illustrated in FIG. 10(*a*), the fourth fold portion 28 may be provided such that a portion of the second conductive plate 10 overlaps the positive electrodes 3, the negative electrodes 4, the separators 6, and the case 13 of a sealed battery 50a. Alternatively, the fourth fold portion 28 may be provided such that a portion of the second conductive plate 10 is to be located on the upper face or the lower face of the electrode assembly 2 included in an adjacent sealed battery 50.

In a case where the third fold portion 27 is provided such that the second clip 8 is located between the second conductive plate 10 and the side face 24b of the multilayered structure 5 of the electrode assembly 2, the fourth fold portion 28 can be formed by folding the second conductive plate 10 along an edge between the second back plate section 40 and the third plate section 38 or the fourth plate section 39 of the second clip 8, or along the second back plate section 40. Thus, it is possible to readily form the fourth fold portion 28, achieving a reduction in production costs of the sealed battery 50. In this case, the fourth fold portion 28 can be formed as shown in FIG. 8. In a case where the second back plate section 40 of the second clip 8 has a cornered U-shape, for example, the fourth fold portion 28 can be formed by folding the second conductive plate 10 along the edge between the second back plate section 40 and the third plate section 38 or the fourth plate section 39 of the second clip 8. In a case where the second back plate section 40 of the second clip 8 has a U-shape, for example, the fourth fold portion 28 can be formed by folding the second conductive plate 10 along the second back plate section 40.

As described above, the positive-electrode external terminal 32 and the negative-electrode external terminal 33 can be disposed in desired positions through the folds at two locations—the first fold portion 25 and the second fold portion 26—at the positive-electrode side, and the folds at two locations—the third fold portion 27 and the fourth fold portion 28—at the negative-electrode side.

The first to fourth fold portions may for example be provided such that the first conductive plate 9 and the second conductive plate 10 are disposed on the same face of the sealed battery 50 as shown in the sealed battery 50 illustrated in FIG. 2(a). Alternatively, the first to fourth fold portions may be provided such that the first conductive plate 9 and the second conductive plate 10 are respectively disposed on opposite faces of the sealed battery 50 as shown in FIG. 2(b). Alternatively, the first to fourth fold portions of a battery may be provided such that one of the first conductive plate 9 and the second conductive plate 10 is to be located on the upper face or the lower face of the electrode assembly 2 of the battery and the other is to be located on the upper face or the lower face of the electrode assembly 2 included in an adjacent sealed battery 50 as shown in FIG. 2(c). Alternatively, the first to fourth fold portions of a battery may be provided such that the first conductive plate 9 is to be located on the upper face or the lower face of the electrode assembly 2 of an adjacent sealed battery 50 and the second conductive plate 10 is to be located on the upper face or the lower face of the electrode assembly 2 included in another adjacent sealed battery 50 as shown in FIG. 2(d).

As described above, assembled batteries 60 illustrated in FIGS. 10(a) to 10(c) can be formed using a plurality of sealed batteries 50 varied in folding directions of the first to fourth fold portions. For example, the assembled battery 60 illustrated in FIG. 10(a) can be formed by combining the batteries 50a to 50c, among which the batteries 50a and 50c each include the first to fourth fold portions provided as shown in FIG. 2(a) and the battery 50b includes the first to fourth fold portions provided as shown in FIG. 2(d).

REFERENCE SIGNS LIST

2: electrode assembly
3: positive electrode
4: negative electrode
5: multilayered structure
6: separator
7: first clip
8: second clip
9: first conductive plate
10: second conductive plate
12: electrolyte
13: case
14: positive-electrode extended section
15: negative-electrode extended section
16: positive-electrode current collection sheet
17: negative-electrode current collection sheet
18: first plate section
19: second plate section
20: first back plate section
21: positive-electrode active material layer
22: negative-electrode active material layer
23: first gripping opening
24a, 24b: side face of the multilayered structure
25, 25a to 25f: first fold portion
26, 26a to 26f: second fold portion
27, 27a to 27f: third fold portion
28, 28a to 28f: fourth fold portion
29a to 29d: end of the plate section at the gripping opening
30, 30a, 30b: fulcrum point
32, 32a to 32f: positive-electrode external terminal
33, 33a to 33f: negative-electrode external terminal
36: weld part
37, 37a, 37b: sealing section
38: third plate section
39: fourth plate section
40: second back plate section
41: second gripping opening
50, 50a to 50f: sealed battery
60: assembled battery

What is claimed is:

1. A sealed battery comprising: an electrode assembly having a multilayered structure in which at least one positive electrode, at least one negative electrode, and at least one separator are layered; a first clip; a first conductive plate joined to the first clip; an electrolyte; and a case housing the electrode assembly, the first clip, and the electrolyte, wherein
the case has a pouch structure made of a laminate film and has, on its peripheral edge, a sealing section where the laminate film is attached to opposite surfaces of the first conductive plate;
the positive electrode has a positive-electrode current collection sheet and a positive-electrode active material layer provided on the positive-electrode current collection sheet, the positive-electrode current collection sheet being a metal foil having a thickness of 10 μm to 40 μm;
the negative electrode has a negative-electrode current collection sheet and a negative-electrode active material layer provided on the negative-electrode current collection sheet, the negative-electrode current collection sheet being a metal foil having a thickness of 10 µm to 40 µm;

the electrode assembly has a positive-electrode extended section which is an overlapping extension of the positive-electrode current collection sheet and extends from the multilayered structure, the overlapping extension not having the positive-electrode active material layer;

the electrode assembly has a negative-electrode extended section which is an overlapping extension of the negative-electrode current collection sheet and extends from the multilayered structure, the overlapping extension not having the negative-electrode active material layer;

the first clip has first and second plate sections and a first gripping opening between an end of the first plate section and an end of the second plate section;

either one of the positive-electrode extended section and the negative-electrode extended section is sandwiched between the first plate section and the second plate section, gripped by the ends bordering the first gripping opening and integrally joined to the first and second plate sections;

the positive-electrode extended section or the negative-electrode extended section integrally joined to the first clip has a first fold portion formed by folding either one of the current collection sheets by using the end of the first or second plate section at the first gripping opening as a fulcrum point;

an apex of the first fold portion is placed at the first gripping opening;

the multilayered structure has a side face, at which either one of the positive-electrode extended section and the negative-electrode extended section is provided;

the first fold portion is provided in such a way that a largest face of the first or second plate section is disposed along the side face of the multilayered structure; and a folded part of the case is placed between the electrode assembly and the first clip.

2. The sealed battery according to claim 1, wherein
the first conductive plate has a second fold portion formed by folding the first conductive plate;
the second fold portion is provided in such a way that a part of the first conductive plate is parallel and overlaps with the positive electrode, the negative electrode, the separator, and the case, or in such a way that the part of the first conductive plate is parallel and overlaps with a positive electrode, a negative electrode, a separator, and a case included in an adjacent sealed battery.

3. The sealed battery according to claim 1, wherein
the first fold portion is provided in such a way that the first clip is disposed between the first conductive plate and the multilayered structure;
the first conductive plate has a second fold portion formed by folding the first conductive plate;
the first clip has a back plate section that connects the first plate section to the second plate section;
the second fold portion is formed by folding the first conductive plate by using a corner between the first or second plate section and the back plate section or by using the back plate section, as a fulcrum point.

4. A sealed battery comprising: an electrode assembly having a multilayered structure in which at least one positive electrode, at least one negative electrode, and at least one separator are layered; a first clip; a first conductive plate joined to the first clip; an electrolyte; and a case housing the electrode assembly, the first clip, and the electrolyte, wherein the case has a pouch structure made of a laminate film and has, on its peripheral edge, a sealing section where the laminate film is attached to opposite surfaces of the first conductive plate;

the positive electrode has a positive-electrode current collection sheet and a positive-electrode active material layer provided on the positive-electrode current collection sheet, the positive-electrode current collection sheet being a metal foil having a thickness of 10 µm to 40 µm;

the negative electrode has a negative-electrode current collection sheet and a negative-electrode active material layer provided on the negative-electrode current collection sheet, the negative-electrode current collection sheet being a metal foil having a thickness of 10 µm to 40 µm;

the electrode assembly has a positive-electrode extended section which is an overlapping extension of the positive-electrode current collection sheet and extends from the multilayered structure, the overlapping extension not having the positive-electrode active material layer;

the electrode assembly has a negative-electrode extended section which is an overlapping extension of the negative-electrode current collection sheet and extends from the multilayered structure, the overlapping extension not having the negative-electrode active material layer;

the first clip has first and second plate sections and a first gripping opening between an end of the first plate section and an end of the second plate section;

either one of the positive-electrode extended section and the negative-electrode extended section is sandwiched between the first plate section and the second plate section, gripped by the ends bordering the first gripping opening and integrally joined to the first and second plate sections;

the positive-electrode extended section or the negative-electrode extended section integrally joined to the first clip has a first fold portion formed by folding the current collection sheet;

the first fold portion is provided in such a way that the first clip is disposed between the first conductive plate and the multilayered structure;

the first conductive plate has a second fold portion formed by folding the first conductive plate;

the first clip has a back plate section that connects the first plate section to the second plate section;

the second fold portion is formed by folding the first conductive plate by using a corner between the first or second plate section and the back plate section or by using the back plate section, as a fulcrum point;

an apex of the first fold portion is placed at the first gripping opening;

an apex of the second fold portion is placed on the corner of the first clip; and a folded part of the case is placed between the electrode assembly and the first clip.

5. The sealed battery according to claim 2, wherein
the first fold portion is provided in such a way that the first clip is disposed between the first conductive plate and the multilayered structure;
the first conductive plate has the second fold portion formed by folding the first conductive plate;
the first clip has a back plate section that connects the first plate section to the second plate section;

the second fold portion is formed by folding the first conductive plate by using a corner between the first or second plate section and the back plate section or by using the back plate section, as a fulcrum point.

6. The sealed battery according to claim 5, wherein the electrode assembly has a stacked structure or a wound structure.

7. The sealed battery according to claim 6, wherein
the multilayered structure has a first side face, at which the positive-electrode extended section is provided, and a second side face, at which the negative-electrode extended section is provided;
the first fold portion is provided in such a way that a largest face of the first or second plate section is disposed along the first or second side face of the multilayered structure.

8. The sealed battery according to claim 4, wherein
the electrode assembly has a stacked structure or a wound structure;
the multilayered structure has a first side face, at which the positive-electrode extended section is provided, and a second side face, at which the negative-electrode extended section is provided;
the first fold portion is provided in such a way that a largest face of the first or second plate section is disposed along the first or second side face of the multilayered structure.

9. The sealed battery according to claim 7, wherein the positive-electrode extended section or the negative-electrode extended section inside the first clip is disposed in such a way that an end of the layer of the extended section closest to the multilayered structure is farther from the first gripping opening than an end of the layer of the extended section farthest from the multilayered structure.

10. The sealed battery according to claim 8, wherein the positive-electrode extended section or the negative-electrode extended section inside the first clip is disposed in such a way that an end of the layer of the extended section closest to the multilayered structure is farther from the first gripping opening than an end of the layer of the extended section farthest from the multilayered structure.

11. The sealed battery according to claim 9, wherein
the first clip is provided in such a way that the positive-electrode extended section is sandwiched between the first plate section and the second plate section, gripped by the ends bordering the first gripping opening and integrally joined to the first and second plate sections;
the positive-electrode extended section has the first fold portion formed by folding the positive-electrode current collection sheet by using the end of the first or second plate section at the first gripping opening as the fulcrum point;
the apex of the first fold portion is placed at the first gripping opening.

12. The sealed battery according to claim 10, wherein
the first clip is provided in such a way that the positive-electrode extended section is sandwiched between the first plate section and the second plate section, gripped by the ends bordering the first gripping opening and integrally joined to the first and second plate sections;
the positive-electrode extended section has the first fold portion formed by folding the positive-electrode current collection sheet by using the end of the first or second plate section at the first gripping opening as the fulcrum point;
the apex of the first fold portion is placed at the first gripping opening.

13. The sealed battery according to claim 11, further comprising: a second clip; and a second conductive plate joined to the second clip, wherein
the case houses the electrode assembly, the first clip, the second clip, and the electrolyte;
the second clip has third and fourth plate sections and a second gripping opening between an end of the third plate section and an end of the fourth plate section;
the negative-electrode extended section is sandwiched between the third plate section and the fourth plate section, gripped by the ends bordering the second gripping opening and integrally joined to the third and fourth plate sections;
the negative-electrode extended section has a third fold portion formed by folding the negative-electrode current collection sheet by using the end of the third or fourth plate section at the second gripping opening as a fulcrum point;
an apex of the third fold portion is placed at the second gripping opening.

14. The sealed battery according to claim 13, wherein
the second conductive plate has a fourth fold portion formed by folding the second conductive plate;
the fourth fold portion is provided in such a way that a part of the second conductive plate overlaps with the positive electrode, the negative electrode, the separator, and the case, or in such a way that the part of the second conductive plate overlaps with a positive electrode, a negative electrode, a separator, and a case included in an adjacent sealed battery.

15. The sealed battery according to claim 1, wherein an inner side of the first fold portion contacts with the end of the first or second plate section.

16. The sealed battery according to claim 1, wherein the first conductive plate is disposed between the first clip and the side face of the multilayered structure.

17. The sealed battery according to claim 1, wherein the end of the first or second plate section of the first clip is not aligned with an end of the first conductive plate and projects from the end of the first conductive plate.

18. The sealed battery according to claim 1, further comprising a sealing section where the laminate film is attached to opposite surfaces of the first conductive plate.

19. The sealed battery according to claim 2, further comprising a sealing section where the laminate film is attached to opposite surfaces of the first conductive plate, wherein the sealing section is disposed between the first fold portion and the second fold portion.

20. The sealed battery according to claim 1, wherein the first conductive plate have a terminal used to connect the sealed battery to an adjacent battery.

* * * * *